(12) United States Patent
Nakasho et al.

(10) Patent No.: US 7,187,156 B2
(45) Date of Patent: Mar. 6, 2007

(54) BATTERY CHARGER

(75) Inventors: Toshiki Nakasho, Sumoto (JP); Eiji Satsuma, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 73 days.

(21) Appl. No.: 11/212,583

(22) Filed: Aug. 29, 2005

(65) Prior Publication Data

US 2006/0043928 A1    Mar. 2, 2006

(30) Foreign Application Priority Data

Aug. 31, 2004 (JP) ............................. 2004-252400

(51) Int. Cl.
*H02J 7/00* (2006.01)
(52) U.S. Cl. ...................... 320/107; 320/106; 320/110; 320/150
(58) Field of Classification Search ................ 320/106, 320/107, 110, 112, 113, 150
See application file for complete search history.

(56) References Cited

U.S. PATENT DOCUMENTS

| | | |
|---|---|---|
| 4,816,735 A | 3/1989 | Cook et al. |
| 5,585,710 A * | 12/1996 | Nakamura et al. ........... 320/112 |
| 5,592,065 A | 1/1997 | Oglesbee et al. |
| 5,686,811 A * | 11/1997 | Bushong et al. ............. 320/110 |
| 2002/0063550 A1 | 5/2002 | Chen et al. |
| 2003/0062251 A1 | 4/2003 | Pfeiffer |

FOREIGN PATENT DOCUMENTS

| | | |
|---|---|---|
| JP | 5-30669 | 2/1993 |
| JP | 2001-185239 | 7/2001 |
| JP | 2002-199609 | 7/2002 |

* cited by examiner

*Primary Examiner*—Karl Easthom
*Assistant Examiner*—Arun Williams
(74) *Attorney, Agent, or Firm*—Wenderoth, Lind & Ponack, L.L.P.

(57) ABSTRACT

The battery charger is provided with temperature detection sections 12 to contact and detect the temperature of AA batteries 2A and AAA batteries 2B loaded in a battery pocket 3, and a charging circuit to detect battery temperature and control battery 2 charging. The battery charger is provided with AA battery 2A holders 11, which are circular openings 13 in the case 1, and AAA battery 2B holders 11, which are flexible arches 14. An AAA battery 2B is inserted into a flexible arch 14 and retained in a fixed position in the battery pocket 3. An AA battery 2A is not inserted into a flexible arch 14, but rather moves the flexible arch 14 causing it to incline, and is inserted into a circular opening 13 for retention in a fixed position in the battery pocket 3. The battery charger charges batteries 2 set in fixed positions in the battery pocket 3 while detecting battery 2 temperature via the temperature detection sections 12.

21 Claims, 22 Drawing Sheets

BATTERY CHARGER

BACKGROUND OF THE INVENTION

1. Field of the Invention

This invention relates to a battery charger for charging both AA (double A) and AAA (triple A) type batteries.

2. Description of the Related Art

Battery chargers that charge both AA and AAA type batteries, while detecting battery temperature, have been developed. The reason for detecting battery temperature during charging is because charging a battery with an abnormally high temperature results in degraded battery performance. Battery temperature rises during charging. In particular, battery temperature rises abruptly as the battery approaches full charge. Abnormal rise in battery temperature is a cause of battery characteristic degradation. To prevent battery performance degradation, battery chargers have been developed which are provided with temperature sensors to detect battery temperature (See Japanese Laid-Open Patent Publication No. 2002-199609A and HEI 5-30669A (1993)).

In the battery charger disclosed in Japanese Laid-Open Patent Publication No. 2002-199609A, a temperature sensor is inserted in soft tubing and placed in contact with a battery pack surface. This temperature sensor contacts a battery surface via the soft tubing and detects battery temperature. In the battery charger disclosed in Japanese Laid-Open Patent Publication No. HEI 5-30669A (1993), the temperature sensor is pushed out by a coil spring to thermally join with a heat conducting part. This temperature sensor detects battery temperature via the heat conducting part.

SUMMARY OF THE INVENTION

In battery chargers cited in these and other disclosures, a temperature sensor detects battery temperature, and for example, charging current is cut off when battery temperature greater than a specified temperature is detected. In battery chargers of this type, accurate detection of battery temperature is difficult. In particular, accurate detection of the temperature of both AA and AAA type batteries, which have different diameters, is even more difficult. Even when a temperature sensor is placed in direct contact with a battery, it cannot always detect temperature accurately. FIG. 1 is a structure investigated by the present applicant wherein a temperature sensor 4 provided with a temperature detection section 4A was pressed in direct contact with the surface of a battery 2. Even with this structure, the temperature sensor 4 could not accurately detect battery temperature because of the action of cool outside air flow in gaps between the battery 2 and the temperature sensor 4, as shown by the arrows of FIG. 1. FIG. 2 is another structure investigated by the present applicant. This structure absorbs battery 2 heat with metal plates 41 and that absorbed heat is conducted to the temperature sensor 4. In the case where batteries are repeatedly inserted and removed for charging, gaps develop between the battery 2 and metal plates 41 of this structure (not illustrated), and suitable measurement of battery 2 temperature becomes difficult. Although battery 2 heat can be conducted to the metal plates 41, the metal plates 41 are cooled by air flow, as shown by the arrows of FIG. 2. Therefore, even with these configurations, battery temperature cannot be accurately detected. As discussed, even when the temperature sensor is placed in direct contact with the battery, or even in a structure which contacts the battery with metal plates, battery temperature cannot be accurately detected. In addition, it is even more difficult to accurately detect battery temperature in real-time with no time delay. Time delays in detection can be corrected to some degree by revising detected temperatures via a micro-computer housed in the battery charger. However, high accuracy micro-computer correction cannot be performed with respect to rapid temperature rise at the end of charging, or with respect to variation in the temperature environment due to repeated charging. This is because the temperature sensor and battery temperature curves do show the same behavior, and the temperature sensor becomes unable to follow the rapid battery temperature variations. When temperature gradients become large, the difference between temperature detected by the temperature sensor and battery temperature gradually increases, and accurate battery temperature detection becomes even more difficult.

A battery charger, with a battery protection function in a circuit that detects battery temperature, does not require temperature detection with a great deal of precision. However, it is important to detect battery temperature with extremely high precision in a battery charger which detects battery temperature, regulates average charging current according to battery temperature, and controls average charging current to consistently maintain battery temperature at a constant value.

The present invention was developed to resolve these types of drawbacks. Thus it is an important object of the present invention to provide a battery charger which has temperature sensors, and can detect battery temperature with high precision and reduced time delay to allow battery charging under ideal temperature conditions.

The battery charger of the present invention is provided with a battery pocket 3 in a case 1 for mounting AA batteries 2A and AAA batteries 2B in manner allowing loading and unloading. The battery charger is also provided with temperature detection sections 12 to contact and detect the temperature of AA batteries 2A and AAA batteries 2B loaded in the battery pocket 3, and a charging circuit to detect battery temperature via the temperature detection sections and control battery 2 charging. Further, the battery charger is provided with AA battery 2A holders 11 to retain AA batteries 2A in fixed positions in the battery pocket 3, and AAA battery 2B holders 11 to retain AAA batteries 2B in fixed positions in the battery pocket 3. AA battery 2A holders 11 are circular openings 13 in the case 1, and AAA battery 2B holders 11 are flexible arches 14. A circular opening 13 in the case 1 has a size that can accept and hold an AA battery 2A in a fixed position. A flexible arch 14 is an arch-shaped arm in which an AAA battery 2B can be inserted but an M battery 2A cannot be inserted. A flexible arch 14 is attached in a manner allowing it to flexibly incline when pressed against by an AA battery 2A. An AAA battery 2B is inserted into a flexible arch 14 holder and retained in a fixed position in the battery pocket 3. An AA battery 2A is not inserted into a flexible arch 14, but rather moves the flexible arch 14 causing it to incline, and is inserted into a circular opening 13 holder for retention in a fixed position in the battery pocket 3. The battery charger charges batteries 2 set in fixed positions in the battery pocket 3 while detecting battery 2 temperature via the temperature detection sections 12.

The battery charger described above has the characteristic that battery temperature can be measured to high precision via temperature sensors, and temperature can be accurately detected while reducing time delays to allow battery charging under ideal temperature conditions. In particular, the battery charger described above has the characteristic that while M batteries and AAA batteries can be mounted in manner allowing loading and unloading, the temperature of those batteries can be accurately detected. This is because the battery charger described above is provided with AA battery holders and AAA battery holders in the battery pocket, M batteries and AAA batteries are mounted in fixed positions in the battery pocket, and the temperature of those batteries is detected by temperature detection sections.

The battery charger described above has circular openings in the case serving as AA battery holders, which can accept and retain AA batteries in fixed positions. It has flexible arch-shaped arms serving as AAA battery holders, which can accept AAA battery insertion but cannot accept AA battery insertion. In this battery charger, when an AAA battery is loaded, it is inserted into a flexible arch of a battery holder and retained in a fixed position in the battery pocket. When an AA battery is loaded, it is not inserted into a flexible arch, but rather moves the flexible arch to a inclined position, and is inserted in a circular opening to retain it in a fixed position in the battery pocket. Consequently, while having battery holders of simple structure, the battery charger described above can load both AA batteries and AAA batteries, which have different outside diameters, in fixed positions in the battery pocket, and can effectively prevent those batteries from shifting out of position. In this manner, a battery charger, which can load both AA batteries and AAA batteries in fixed positions in a battery pocket, can accurately detect the temperature of AA batteries and AAA batteries loaded in the battery pocket via temperature detection sections to allow serving ideal control of battery charging.

In the battery charger of the present invention, a flexible arch 14 is positioned such that it is pushed to a reclining attitude by an AA battery 2A to contact an output terminal 7, which also contacts a battery 2 terminal. This allows formation of a wire contact switch 17 made up of a flexible arch 14 and an output terminal 7.

This battery charger has the characteristic that a flexible arch, which is an AAA battery holder, serves a dual purpose as a contact of a wire contact switch. This is because a flexible arch is positioned to contact an output terminal when pushed to a reclining attitude by an AA battery, and a wire contact switch is made up of a flexible arch and an output terminal.

Further, the battery charger described above can detect the ON or OFF state of a wire contact switch 17, which is made up of a flexible arch 14 and output terminal 7, to determine the loading position of an AAA battery 2B.

This battery charger has the characteristic that charging an improperly loaded AAA battery can be effectively prevented. Since the temperature of an improperly loaded battery cannot be accurately detected by the temperature detection section, battery temperature can become abnormally high and battery degradation can occur. Since this battery charger can charge while judging the loading position of an AAA battery, it eliminates this type of drawback.

The battery charger of the present invention is provided with convertible output terminals 8 to switch between loading AA batteries 2A and AAA batteries 2B in the battery pocket 3. A position switch 15 is provided to detect the convertible position of a convertible output terminal 8, and the ON or OFF state of a position switch 15 can be detected to judge the type of battery 2 loaded in the battery pocket 3.

This battery charger has the characteristic that it can charge batteries while accurately judging whether M batteries or AAA batteries are loaded.

Further, the battery charger of the present invention can detect the ON or OFF state of the position switches 15 and the wire contact switches 17 to determine the locations at which AA batteries 2A and AAA batteries 2B are loaded in the battery pocket 3.

This battery charger has the characteristic that proper loading of AA batteries and AAA batteries can be accurately determined to effectively prevent charging an improperly loaded battery. In this manner, a configuration that judges battery loading position with both position switches and wire contact switches can more reliably detect an improperly loaded battery.

Still further, the battery charger of the present invention can be provided with a detection circuit 16 to detect the ON or OFF state of a position switch 15 and a wire contact switch 17. This detection circuit 16 is provided with voltage divider resistors 18 and a voltage detection circuit 20 to detect the voltage at the intermediate node 19 of the voltage divider. Voltage divider resistors 18 are connected in series with a wire contact switch 17 and are connected to the power supply 21. In addition, the intermediate node 19 of the voltage divider is connected through a position switch 15 to either the positive or negative power supply 21. The voltage detection circuit 20 detects intermediate node 19 voltage to determine the ON or OFF state of the position switch 15 and wire contact switch 17, and can thereby judge the loading position of an AA battery 2A and an AAA battery 2B.

This battery charger has the characteristic that loading positions of AA batteries and AAA batteries can be reliably judged while using a detection circuit with a simple circuit structure. The above and further objects and features of the invention will more fully be apparent from the following detailed description with accompanying drawings.

DETAILED DESCRIPTION OF THE PREFERRED EMBODIMENTS

Figure 1:
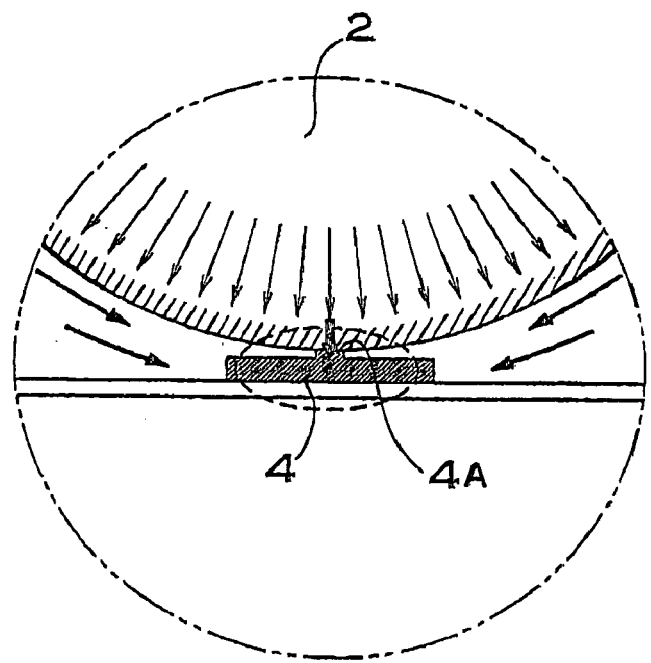
FIG. 1 is an abbreviated cross-section view showing battery temperature detection in a structure investigated by the present patent applicant.
Figure 2:
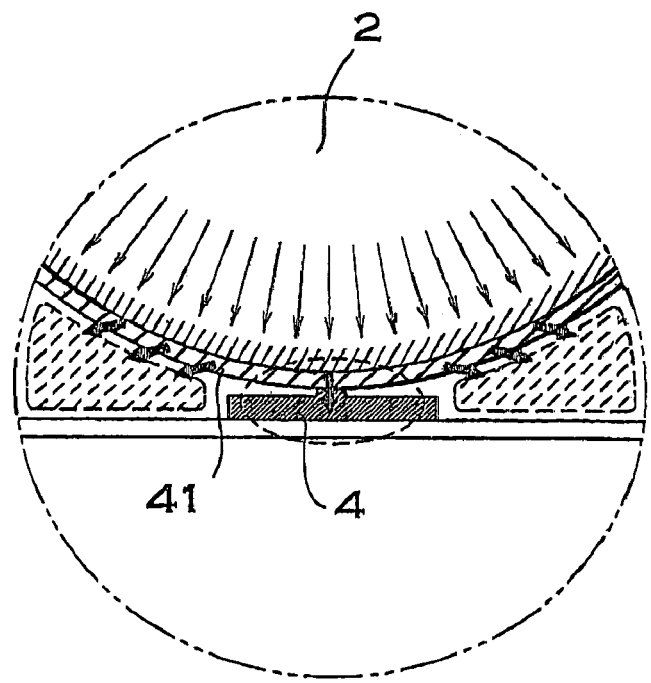
FIG. 2 is an abbreviated cross-section view showing battery temperature detection in another structure investigated by the present patent applicant.

The battery charger shown in FIGS. 3–10 has an approximately rectangular box outline, and is provided with a battery pocket 3 allowing batteries 2 to be loaded and unloaded for charging. The battery pocket 3 is provided in the upper surface of a case 1, which is the lower part of the plan view of FIG. 4. Temperature detection sections 12 are disposed in the battery pocket 3 to detect the temperature of batteries 2 loaded in the battery pocket 3. Further, a charging circuit (not illustrated) mounted on a circuit board 5 in the case 1 enables the battery charger to detect battery 2 temperature with the temperature detection sections 12 and control average charging current to the batteries 2. Except for parts such as the power line 32 and socket 33, this battery charger has a fundamentally symmetric structure with respect to left and right on the page of FIG. 4.

The case 1 is made of resin material, has a lower case 1B and an upper case 1A, and the upper case 1A is joined to the lower case 1B to house the circuit board 5 inside. The circuit board 5 is attached to the lower case 1B. Output terminals 6, 7, which connect with terminals of batteries 2 loaded in the battery pocket 3, are fixed to the circuit board 5. The output terminals 6, 7 are metal plates which can elastically deform. Since four AA batteries 2A are loaded for charging in the battery charger of FIG. 4, four pairs of output terminals 6, 7 are provided.

In addition, the battery charger of the figures can charge both AA batteries 2A and AAA batteries 2B. These single cell, rechargeable AA batteries 2A and AAA batteries 2B are long, slender, and have a circular cylindrical shape. In particular, the surface of the metal can of these batteries is covered with a resin tube except for the positive and negative terminals at both ends.

Figure 4:
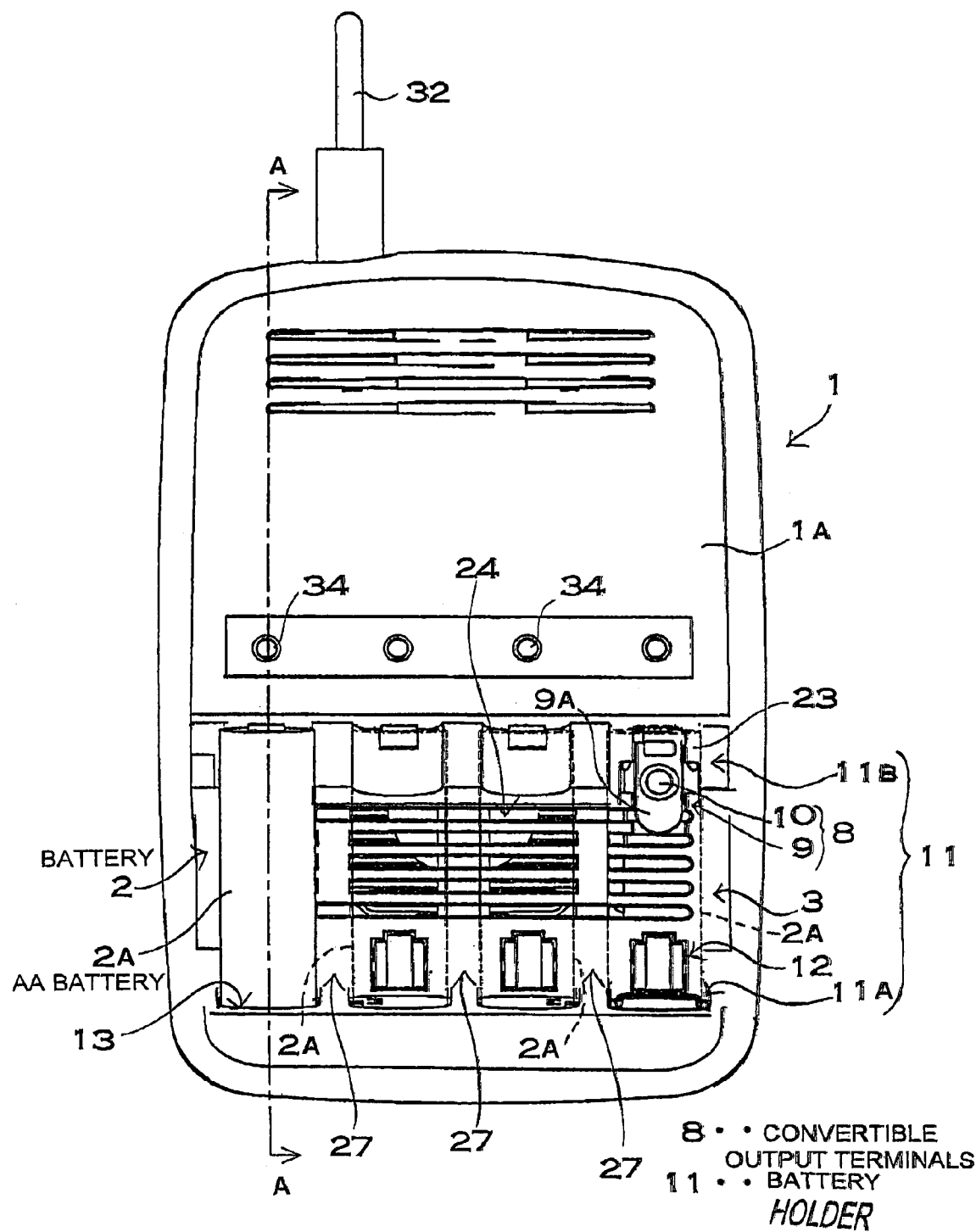
FIG. 4 is a plan view showing an M type battery loaded in the battery charger shown in FIG. 3.
Figure 9:
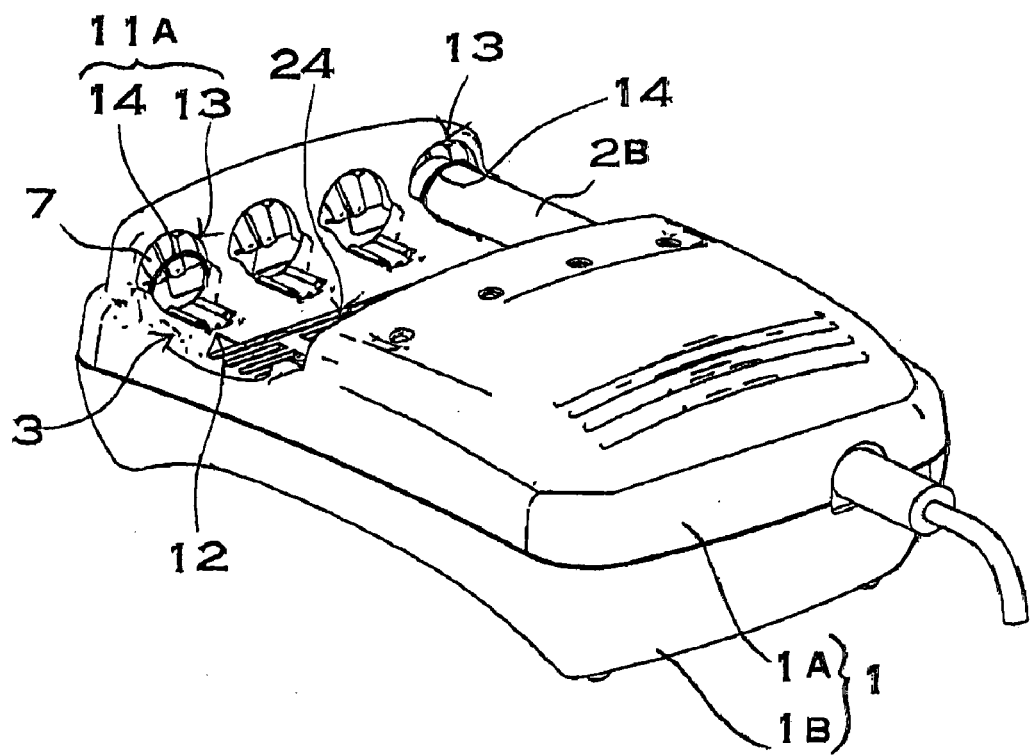
FIG. 9 is an oblique rear view showing an AAA battery loaded in the battery charger shown in FIG. 8.
Figure 10:
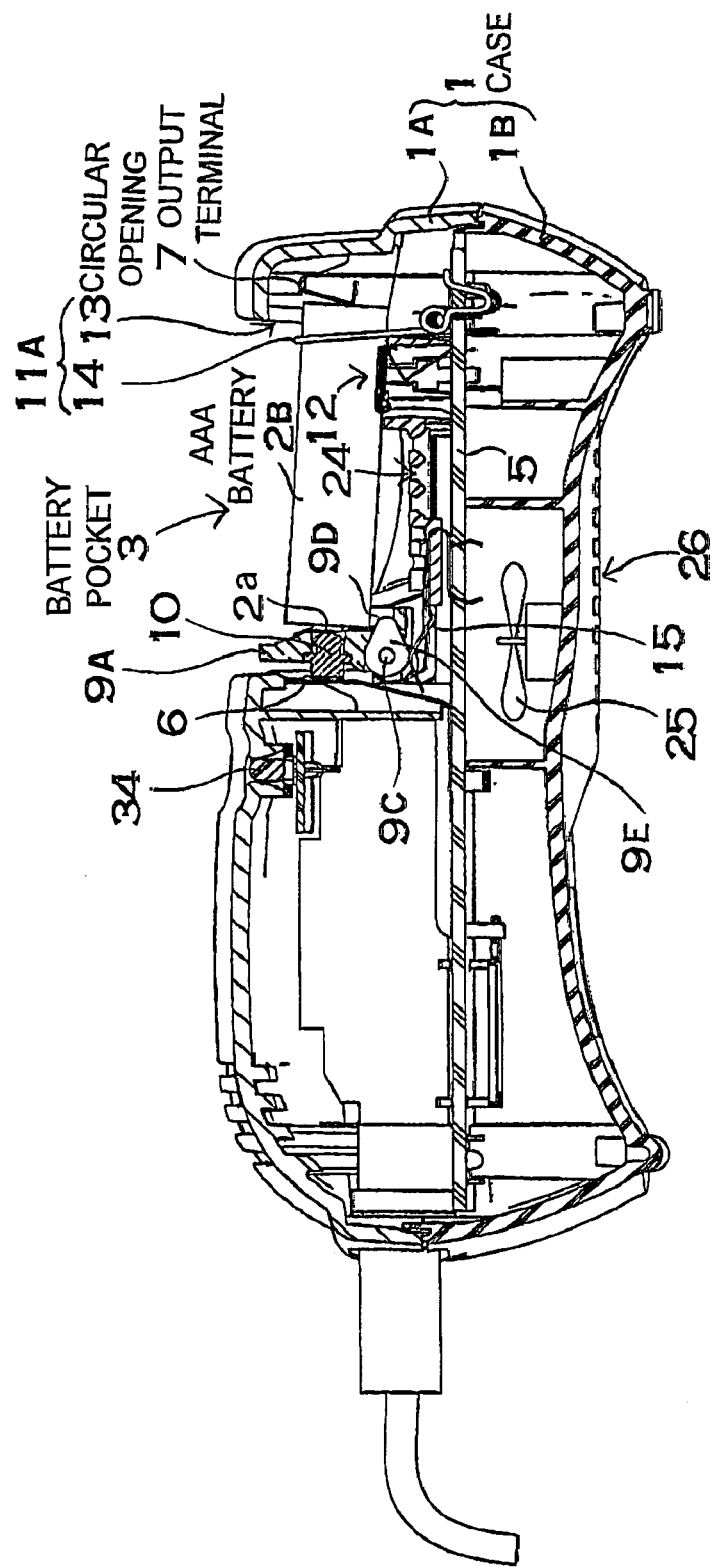
FIG. 10 is a cross-section view of the battery charger shown in FIG. 8; this view is analogous to a cross-section through the line A—A of FIG. 4.

First, when charging AA type batteries 2, the positive terminal ends of the batteries 2 are put in contact with output terminals 6 with the convertible output terminals 8 in the down position, as shown in FIGS. 4–7. The negative terminal ends of the batteries 2 are put in contact with output terminals 7. In FIG. 4, the AA battery 2A positioned in the left-most battery holder 11 is shown with solid lines, AA batteries 2A located in other battery holders 11 are shown with broken lines, and a total of four batteries can be loaded. Next, FIGS. 9 and 10 show charging of AAA batteries 2B, which are smaller in size than AA batteries. As shown in these and other figures, AAA batteries 2B are loaded and charged with the convertible output terminals 8 in the up, or vertical position. Two AAA batteries 2B can be loaded and charged in the left-most and right-most locations in the battery pocket 3 of FIG. 4 (in FIG. 9, only one AAA battery 2B is shown). With convertible output terminals 8 in this position, as shown in FIG. 10, AAA battery 2B terminals connect with output terminals 6 via metal extension terminals 10. Extension terminals 10 are disposed between AAA battery 2B terminals and output terminals 6, and connect AAA battery 2B terminals and output terminals 6. With this configuration, AAA batteries 2B, which are shorter than AA batteries 2A, connect to output terminals 6. Output terminals 7 connect to negative end terminals of AAA batteries 2B.

Figure 8:
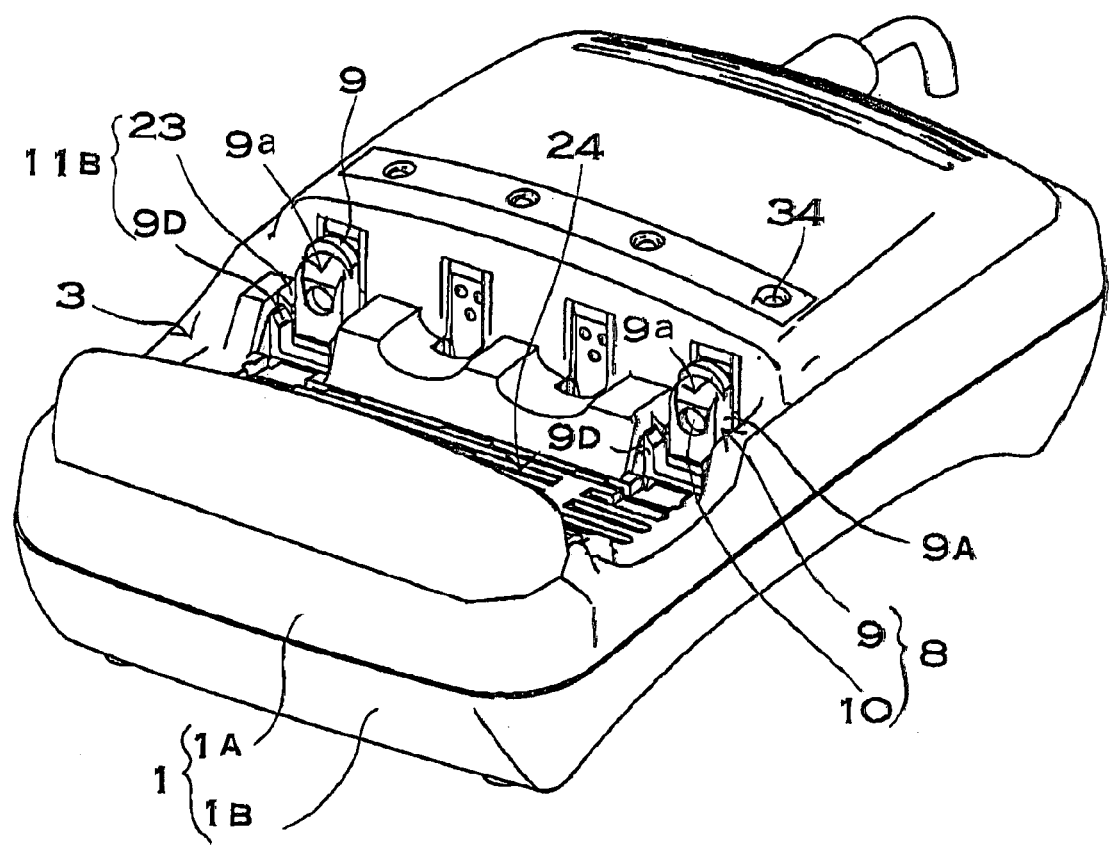
FIG. 8 is an oblique view showing the battery charger shown in FIG. 3 with its convertible output terminals in the up position.
Figure 11:
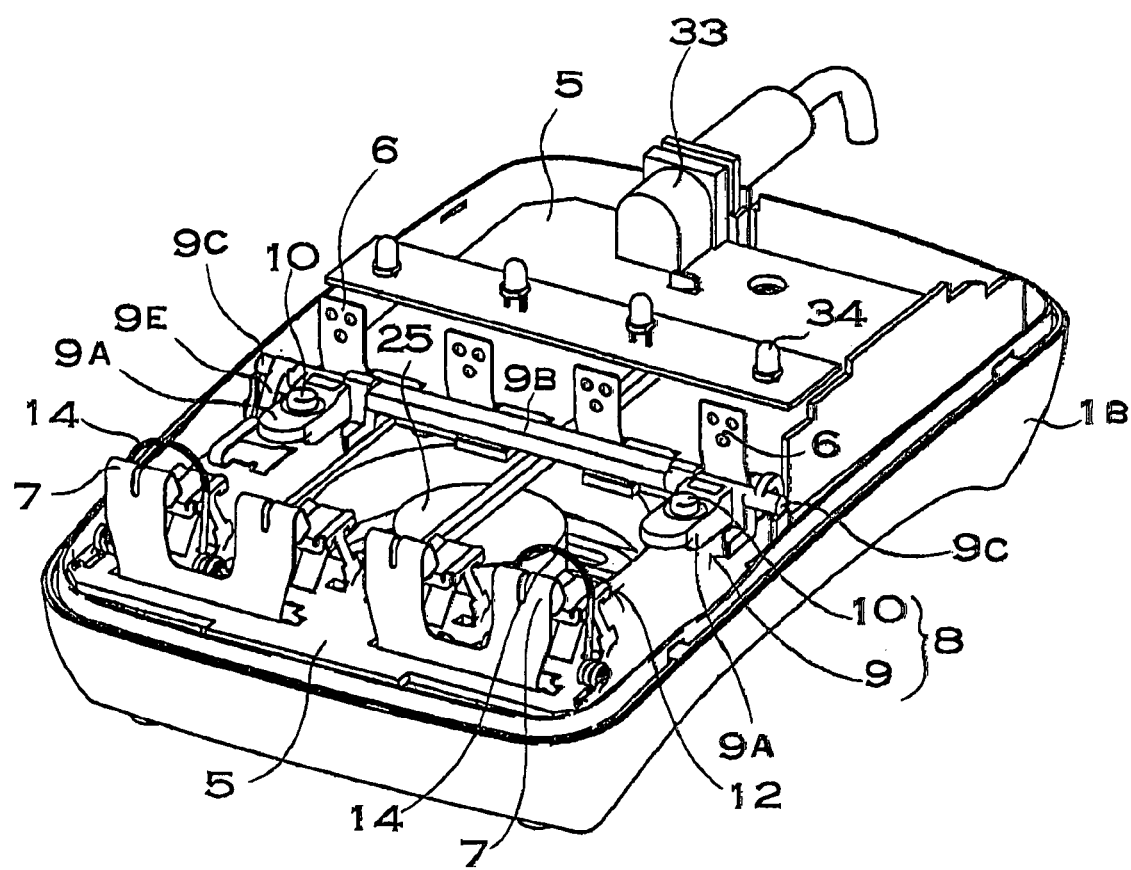
FIG. 11 is an oblique view showing the battery charger shown in FIG. 3 with its upper case removed.

The convertible output terminals 8 have extension terminals 10 fixed to a plastic support unit 9. As shown in FIG. 10, when convertible output terminals 8 are in the up position, extension terminals 10 intervene between AAA battery 2B terminals and output terminals 6 to connect AAA battery 2B terminals and output terminals 6. As shown in FIG. 11, the plastic support unit 9 is provided with approximately flat-plate insulating base regions 9A which hold each extension terminal 10, and a connecting region 9B which joins those base regions 9A. As shown in FIG. 8, the convertible output terminals 8 are provided with cavities 9a in the base regions 9A that allow insertion of the protruding positive terminals 2a of AAA batteries 2B. The extension terminals 10 are disposed passing through the base regions 9A at the bottoms of those cavities 9a allowing the extension terminals 10 to make contact with the protruding positive terminals 2a of AAA batteries 2B. Pivot regions 9C provided at both ends of the plastic support unit 9 connect to the case 1 or the circuit board 5 to allow the flat-surface insulating base regions 9A to rotate from horizontal to vertical. In addition, when the plastic support unit 9 is rotated to the vertical position as shown in FIG. 8, there are oblique battery holders 9D in the form of truncated V's to hold the bottom sides of AAA batteries 2B.

Figure 7:
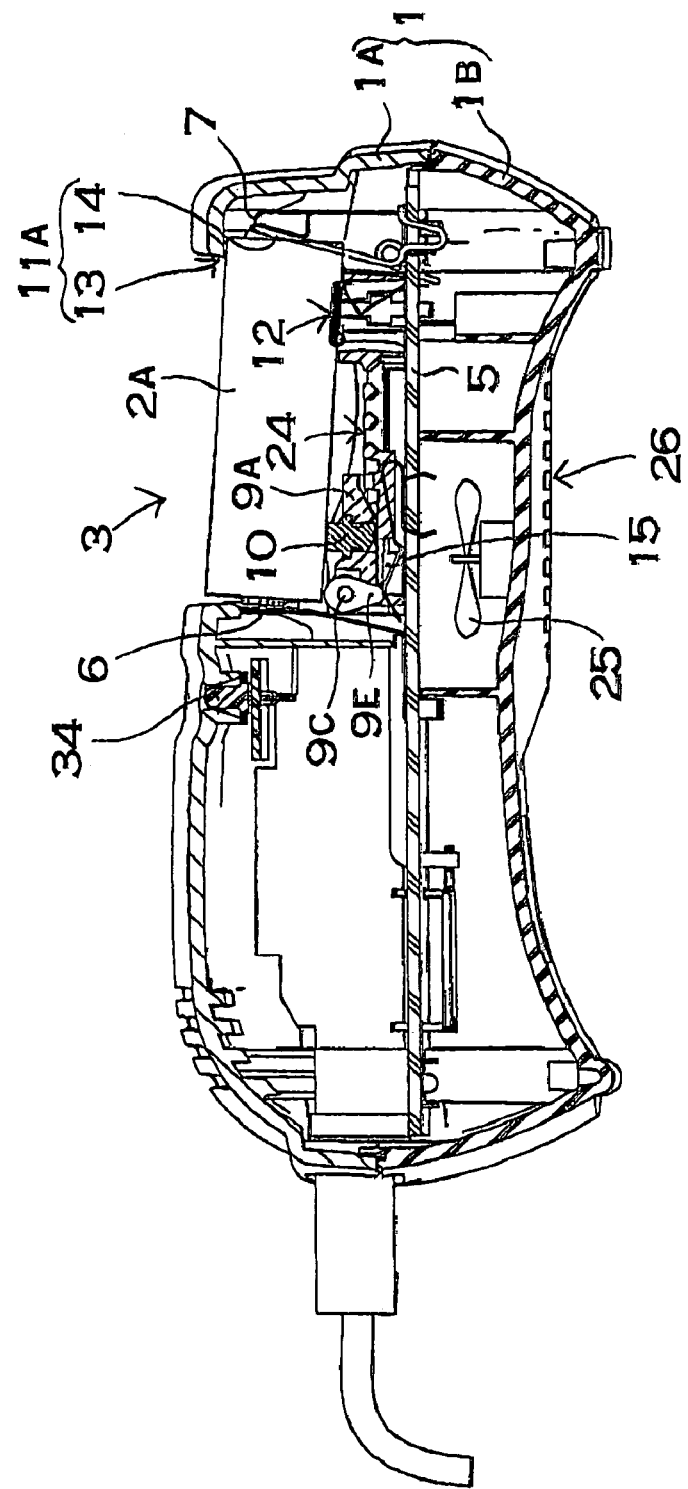
FIG. 7 is a cross-section view through the line A—A of the battery charger shown in FIG. 4.

FIG. 10 shows charging of an AAA battery 2B. In this configuration, convertible output terminals 8 are rotated up putting insulating base regions 9A in the vertical position and disposing them in front of AA battery 2A output terminals 6. When insulating base regions 9A are rotated to vertical, extension terminals 10 are connected with the charging circuit (not illustrated) for AAA batteries 2B. When charging AAA batteries 2B, a switch activation piece 9E, formed as a unit with pivot regions 9C of the convertible output terminals 8, releases pressure on a position switch 15 mounted on the circuit board 5 turning that position switch 15 OFF and connecting the charging circuit for AAA batteries 2B. When insulating base regions 9A are dropped to horizontal for charging AA batteries 2A, the switch activation piece 9E rotates to press the position switch 15, turn the position switch 15 ON, and connect the charging circuit for AA batteries 2A. As shown in FIGS. 7 and 10, the switch activation piece 9E is a cam which projects out from the pivot regions 9C of the support unit 9. This switch activation piece 9E is configured such that when insulating base regions 9A are dropped to horizontal, the position switch 15 mounted on the circuit board 5 is pressed by the end of the cam, and when insulating base regions 9A are raised to vertical, pressure is released from the position switch 15 due to cam rotation.

Figure 3:
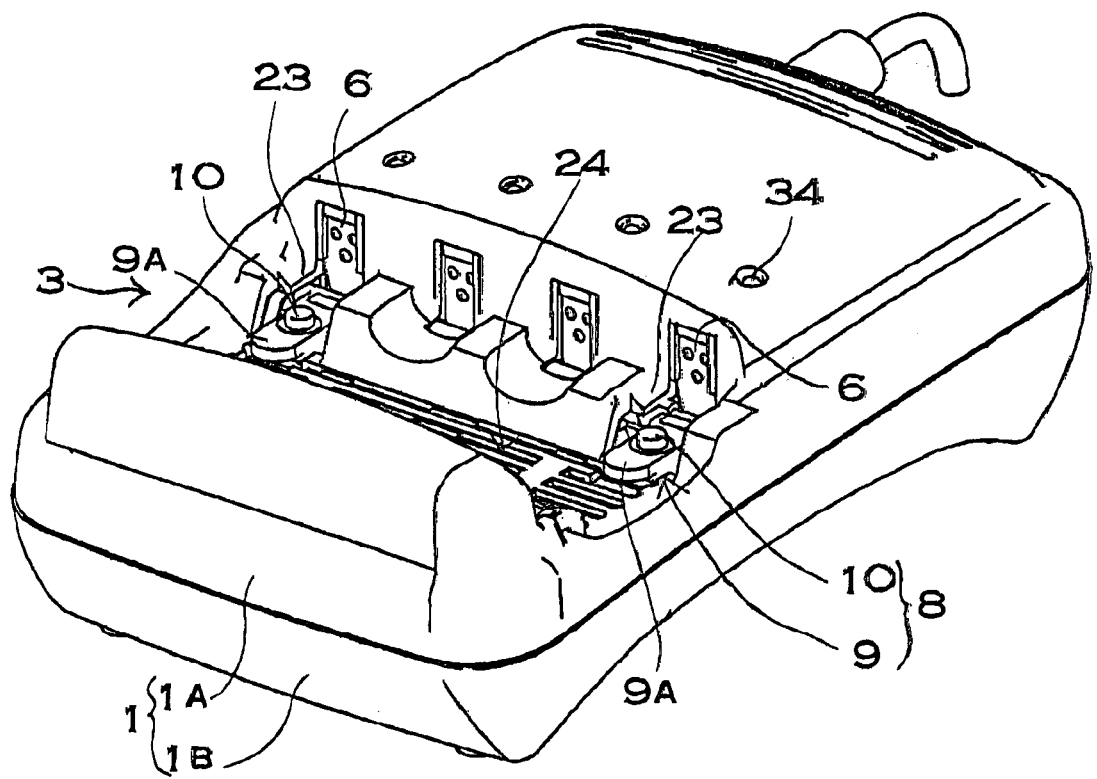
FIG. 3 is an oblique view of a battery charger of an embodiment of the present invention.

When charging AA batteries 2A, as shown in FIGS. 3 and 7, insulating base regions 9A of the convertible output terminals 8 are dropped to the horizontal position moving them down from in front of the AA battery 2A output terminals 6. Insulating base regions 9A, which have been moved to these positions, do not interfere with the loading of AA batteries 2A in the battery pocket 3. Said differently, insulating base regions 9A are moved to positions where they do not hinder AA battery 2A loading in the battery pocket 3. In this configuration, when AA batteries 2A are loaded in the battery pocket 3, the AA batteries 2A connect with output terminals 6 fixed to the circuit board 5. Output terminals 6 are connected with a charging circuit (not illustrated) and AA batteries 2A are charged. As discussed later, this charging circuit controls average charging current to maintain battery temperature at a holding temperature and charge batteries in a short time.

Figure 5:
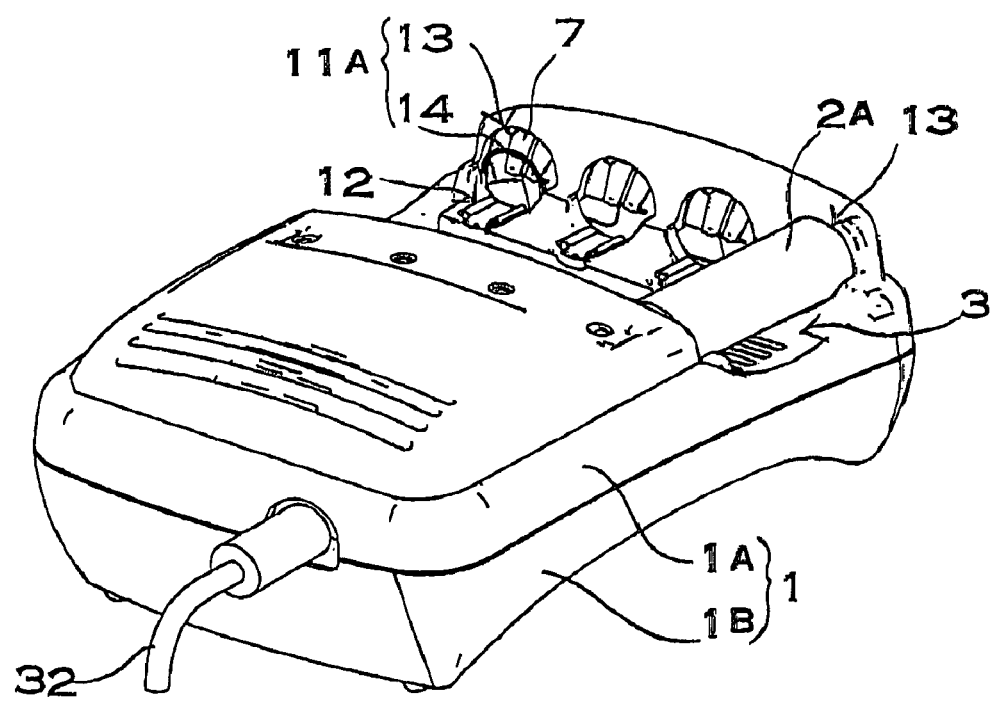
FIG. 5 is an oblique rear view of the battery charger shown in FIG. 4.
Figure 6:
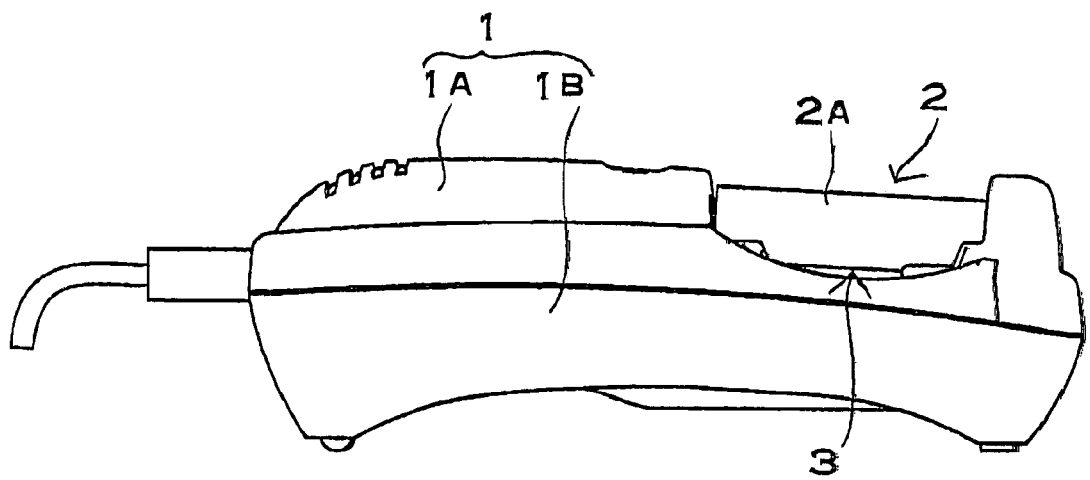
FIG. 6 is a side view of the battery charger shown in FIG. 4.

The case 1 shown in the figures is provided with pairs of battery holders 11. First battery holders 11A and second battery holders 11B make up the battery holders 11, which retain long slender circular cylindrical batteries 2 in a manner that keeps both ends of the batteries 2 from shifting position. As shown in FIGS. 5 and 9, the first battery holders 11A are circular openings 13, which are AA battery 2A holders, and flexible arches 14, which are AAA battery holders. Circular openings 13 are provided through the case 1 walls allowing them to retain negative terminal ends of M batteries 2A which are inserted in those openings. Since the end regions of circular cylindrical AA batteries 2A are inserted in the circular openings 13, the internal shapes of those circular openings 13 are made slightly larger than the outlines of the end regions of AA batteries 2A. Circular opening 13 internal shapes slightly larger than AA battery 2A outlines means AA batteries 2A can be smoothly inserted into the circular openings 13, but the shape allows the inserted batteries to be held without shifting position.

Since flexible arches 14, which are AAA battery 2B holders, accept and retain the end regions of AAA batteries 2B, the internal shapes of those flexible arches 14 are made slightly larger than the outlines of AAA batteries 2B. Flexible arch 14 internal shapes slightly larger than AAA battery 2B outlines means AAA batteries 2B can be smoothly inserted into the flexible arches 14, but the shape allows the inserted batteries to be held without shifting position. However, flexible arch 14 internal shapes are made smaller than AA battery 2A outlines, and their shapes do not allow AA battery 2A insertion.

AAA batteries 2B are inserted into flexible arches 14 and set in fixed positions in the battery pocket 3. An AAA battery 2B disposed in a fixed position makes proper contact with a temperature detection section 12 and its battery temperature is detected. The temperature of an AAA battery 2B, which is not disposed in a fixed position, cannot be accurately detected by a temperature detection section 12. To properly detect AAA battery 2B temperature with a temperature detection section 12, a flexible arch 14 is provided with a mechanism to detect whether or not an AAA battery 2B is properly set in position for charging.

Figure 12:
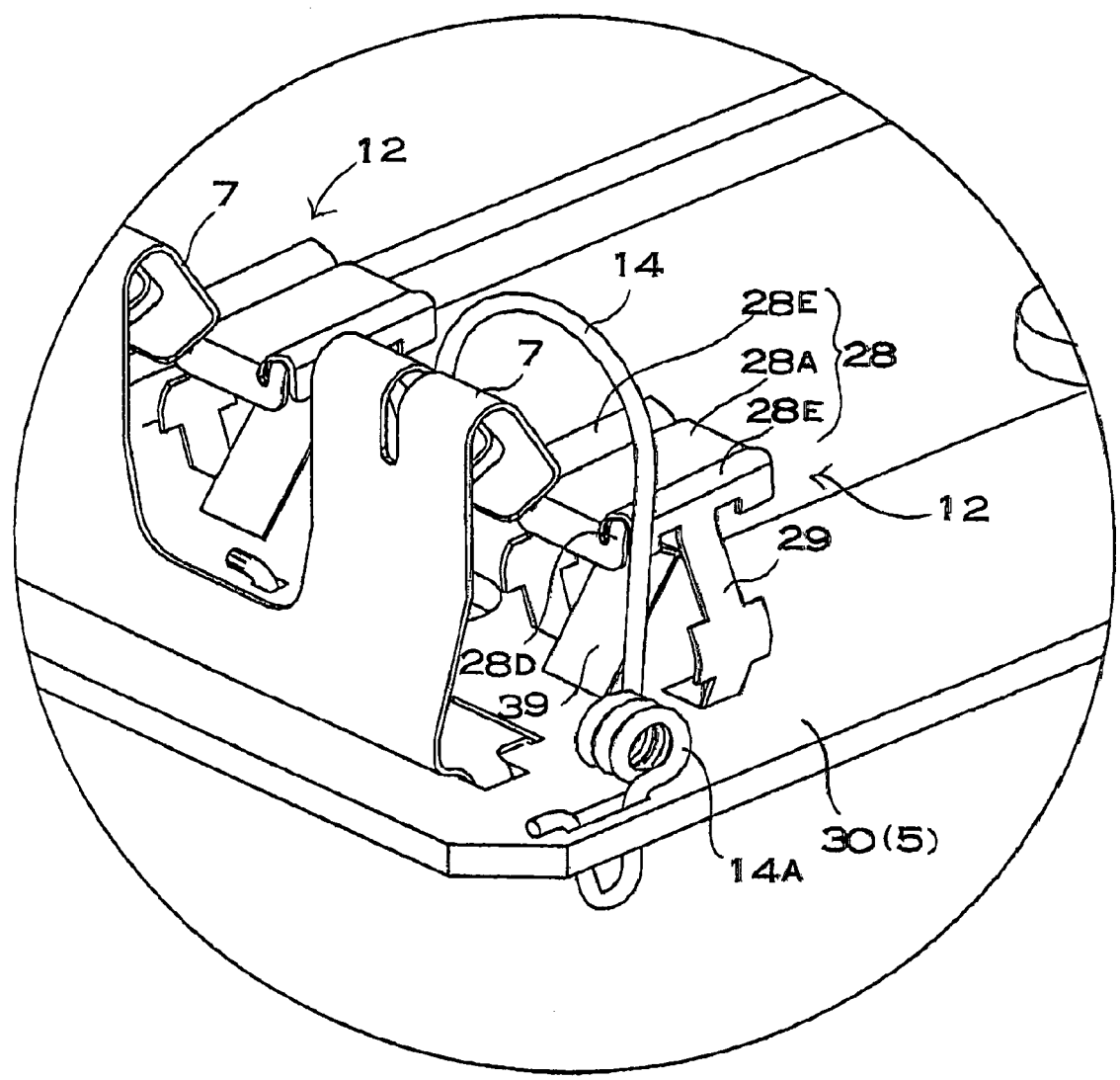
FIG. 12 is an enlarged oblique view showing the vicinity of a temperature detection section of the battery charger shown in FIG. 11.
Figure 13:
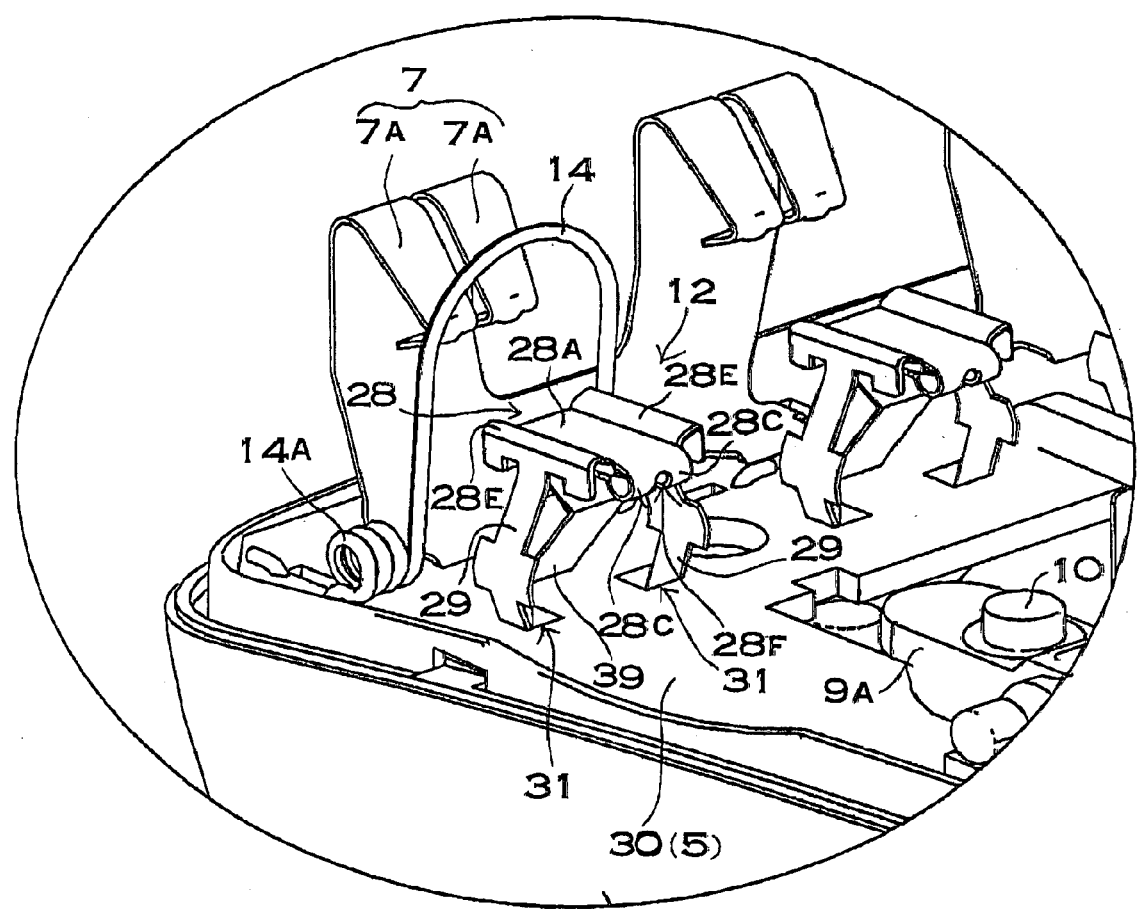
FIG. 13 is an oblique view of the temperature detection section shown in FIG. 12 viewed from the opposite side.
Figure 14:
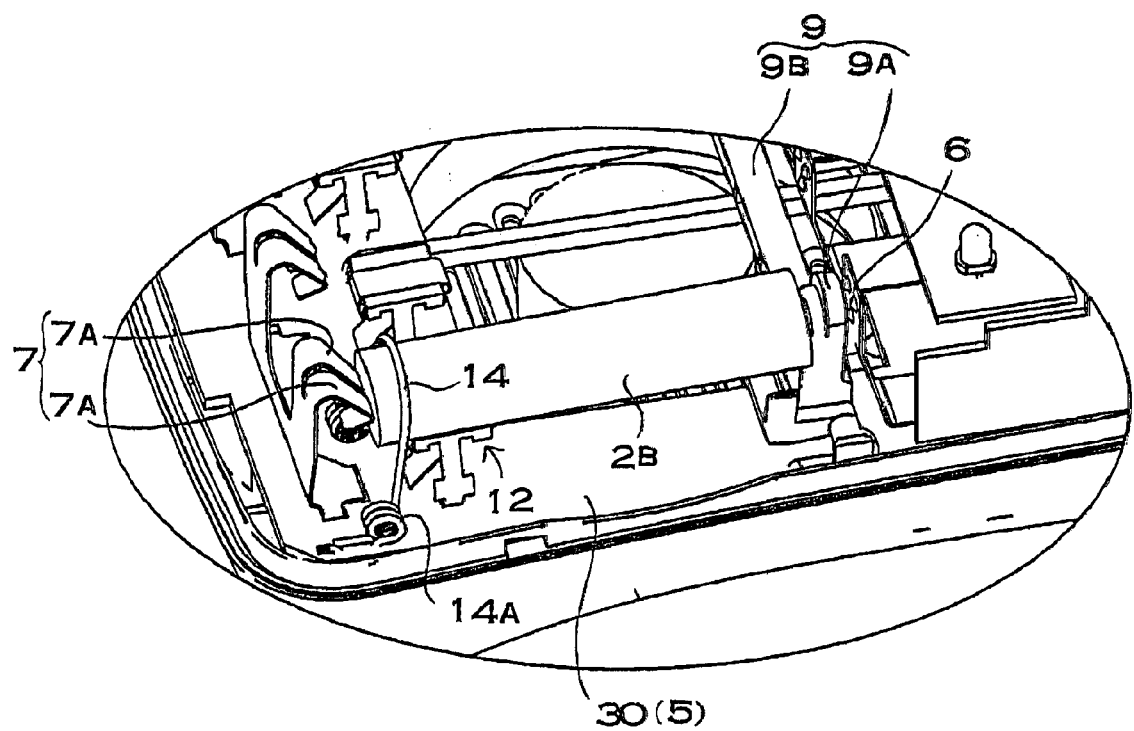
FIG. 14 is an oblique view of the battery charger shown in FIG. 8 showing an AAA battery loaded with the upper case removed.
Figure 15:
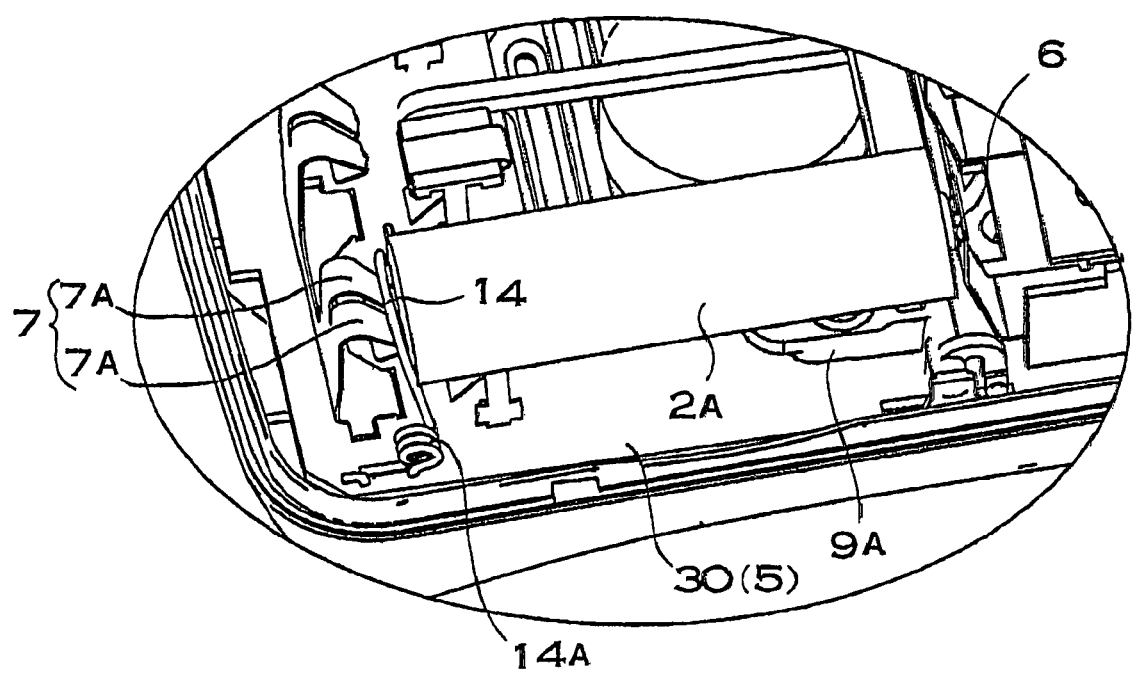
FIG. 15 is an oblique view of the battery charger shown in FIG. 3 showing an AA battery loaded with the upper case removed.

As shown in the enlarged oblique views of FIGS. 12 and 13, a flexible arch 14 is conductive, flexible metal wire bent into a U-shape with both ends fixed to the circuit board 5. The flexible arches 14 of the figures are provided with coiled-spring sections 14A at their lower ends to allow the flexible arches 14 to smoothly incline. As shown in FIG. 12, when a flexible arch 14 is not pressed against, it is in a position separated from the output terminal 7, and as shown in FIG. 14, it is in a position for insertion of an AAA battery 2B and for retention of that battery in a fixed position. As shown in FIG. 15, when pressed against by an AA battery 2A, the flexible arch 14 elastically deforms to contact an output terminal 7. In addition, even when the flexible arch 14 is pressed against by an improperly set AAA battery 2B, it will contact the output terminal 7. Specifically, a flexible arch 14 contacts an output terminal 7 when an AA battery 2A is loaded properly, and does not contact an output terminal 7 when an AAA battery 2B is loaded properly. Therefore, contact or no contact between a flexible arch 14 and output terminal 7 can be detected to determine if an AAA battery 2B is set in proper position for charging.

Figure 16:
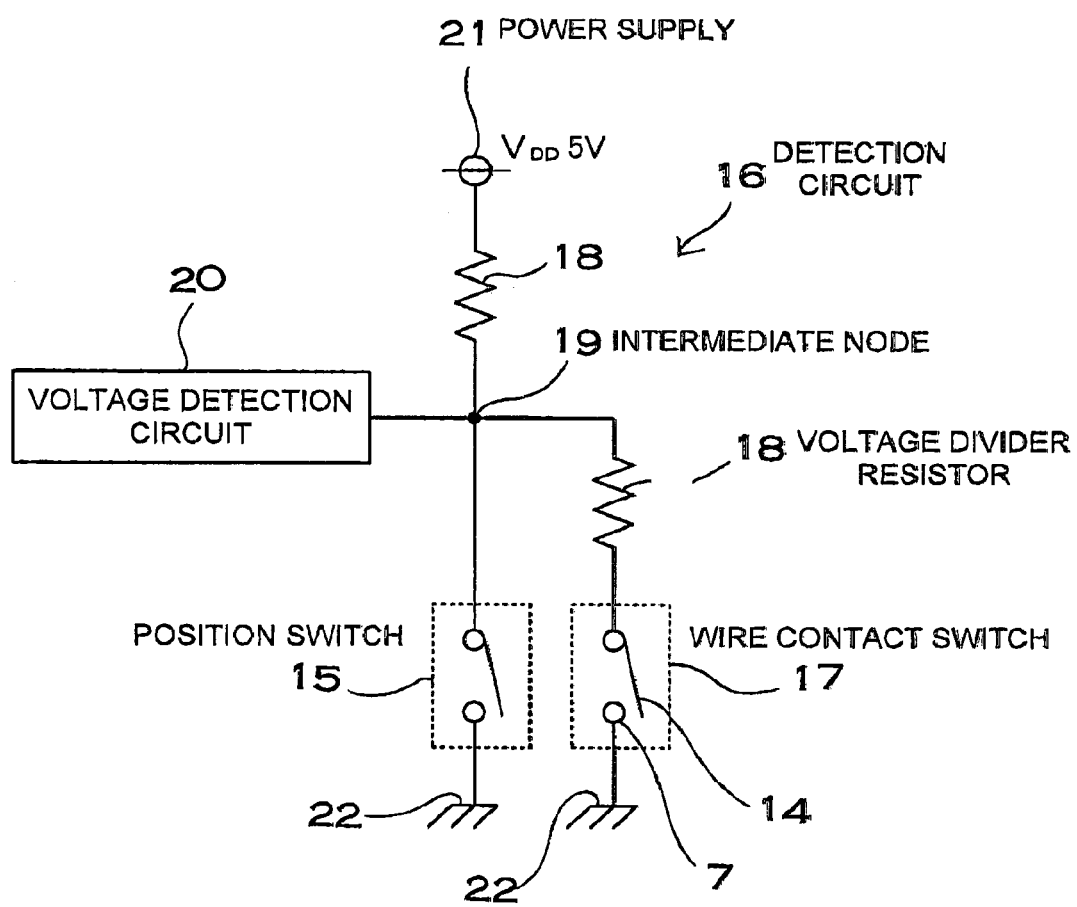
FIG. 16 is a circuit diagram showing one example of a detection circuit.

A circuit diagram of a detection circuit 16 to detect whether or not a flexible arch 14 contacts an output terminal 7 is shown in FIG. 16. A wire contact switch 17 is configured to be ON when the flexible arch 14 contacts an output terminal 7 and OFF when the flexible arch 14 does not contact the output terminal 7. A wire contact switch 17 has a flexible arch 14 and output terminal 7 as contacts, and since the contact on one side, which is the output terminal 7, is connected to the negative terminal of a battery 2, it is connected to ground. The detection circuit 16 of the figure is provided with two voltage divider resistors 18 connected in series, and a voltage detection circuit 20, which is a device such as a microcomputer, to detect voltage at the intermediate node 19 of the voltage divider resistors 18. Voltage divider resistors 18 are connected in series with a wire contact switch 17 and are connected to the power supply 21. In the detection circuit 16 of the figure, one end of the voltage divider resistors 18 is connected to positive side of the power supply 21, and the other end is connected to the flexible arch 14, which is part of the wire contact switch 17. The output terminal 7 of the wire contact switch 17 is connected to the negative side of the power supply, which is ground 22. In addition, this detection circuit 16 is provided with a position switch 15, which detects the rotational position of the convertible output terminals 8 that change position for AA batteries 2A and AAA batteries 2B. The position switch 15 is connected between the intermediate node 19 of the voltage divider and ground 22. This position switch 15 switches ON for the AA battery 2A position and OFF for the AAA battery 2B position.

The detection circuit 16 described above judges whether AA batteries 2A and AAA batteries 2B are properly set in position for charging by the following operations.

(1) When an AA Battery 2A is Set Properly

In this situation, the position switch 15 and wire contact switch 17 turn ON. This is because the position switch 15 turns ON for the AA battery 2A position as shown in FIG. 7, and the flexible arch 14 is pushed by the AA battery 2A to contact the output terminal 7 and turn the wire contact switch 17 ON. Since the position switch 15 is ON, voltage at the intermediate node 19 becomes 0V. As a result, 0V at the intermediate node 19 is confirmed and AA battery 2A charging is started. When the position switch 15 turns ON, intermediate node 19 voltage becomes 0V regardless of whether the wire contact switch 17 is ON or OFF. Although the wire contact switch 17 cannot be judged ON or OFF in this state, the wire contact switch 17 must turn ON when an AA battery 2A is loaded, and it is not necessary to detect the ON or OFF state of the wire contact switch 17. The reason the wire contact switch 17 must be ON is because the interior shape of the flexible arch 14 is smaller than the outline of an AA battery 2A.

(2) When an AAA Battery 2B is Set Properly

In this situation, the position switch 15 and wire contact switch 17 turn OFF. This is because the position switch 15 turns OFF when the convertible output terminal 8 is positioned for charging AAA batteries 2B as shown in FIG. 10. In addition, an AAA battery 2B is inserted in the flexible arch 14, the flexible arch 14 does not contact the output terminal 7, and the wire contact switch 17 turns OFF in this state. Since the position switch 15 and the wire contact switch 17 are OFF, the voltage of the intermediate node 19 of the voltage divider becomes the power supply voltage. As a result, with the intermediate node 19 voltage at the power supply voltage, an AAA battery 2B is judged to be properly set, and AAA battery 2B charging is started.

(3) When an AAA Battery 2B is Set Improperly

Figure 17:
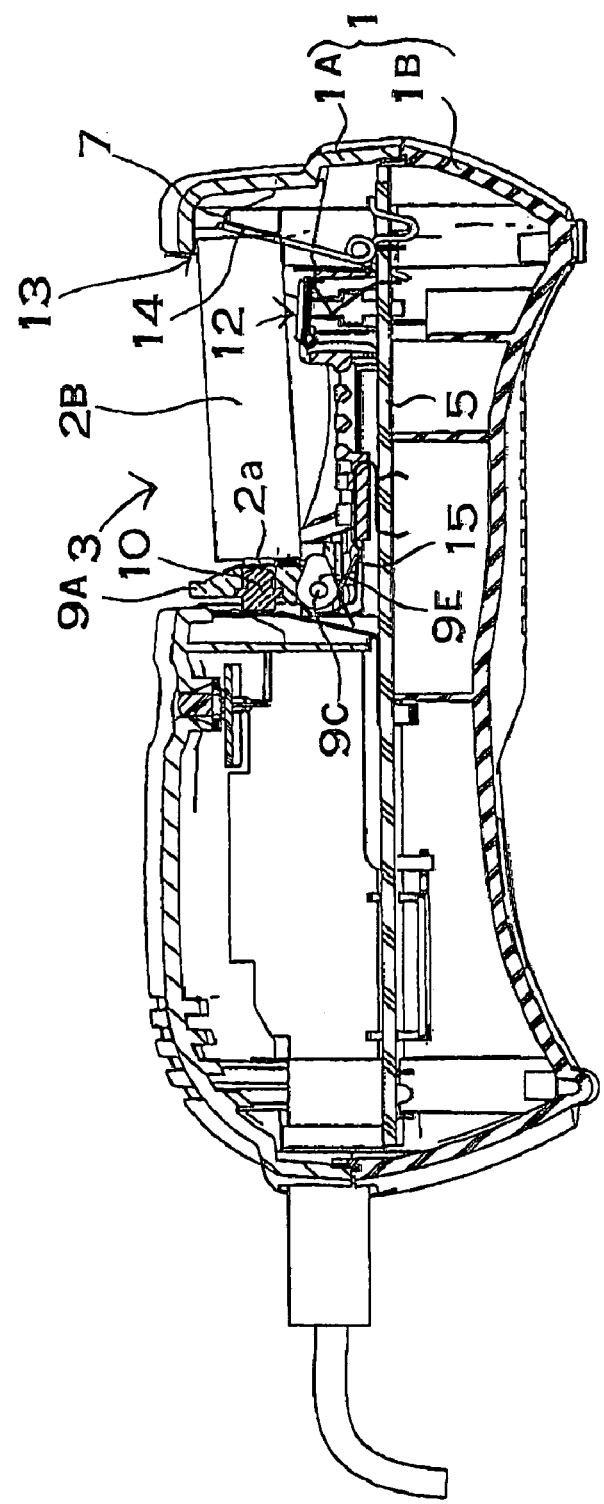
FIG. 17 is a cross-section view showing an improperly loaded AAA battery in the battery charger shown in FIG. 10.

When an AAA battery 2B is not properly loaded and the flexible arch 14 is pushed against the output terminal 7 as shown in FIG. 17, the wire contact switch 17 turns ON. In this situation, since the position switch 15 is OFF and the wire contact switch 17 is ON, voltage at the intermediate node 19 of the voltage divider becomes the power supply voltage divided down by the voltage divider resistor 18 ratio. In the case where the voltage divider resistors 18 are of equal electrical resistance and connected in series, the intermediate node 19 voltage is one half the power supply voltage. As a result, when intermediate node 19 voltage is the power supply voltage divided down by the voltage divider, for example, when the intermediate node 19 voltage is half the power supply voltage, an AAA battery 2B is judged to be improperly set, and AAA battery 2A charging is not started. When an AAA battery 2B is loaded in this fashion, the temperature detection section 12 cannot accurately detect battery temperature. This is because the temperature detection section 12 does not properly contact the surface of the AAA battery 2B. If an AAA battery 2B is charged without the ability to accurately detect battery temperature with the temperature detection section 12, battery temperature can become abnormally high, and battery degradation can occur. Therefore, AAA battery 2B charging is not started in this situation.

In the detection circuit 16 described above, one end of the voltage divider resistors 18 is connected to the positive side of the power supply 21, and the wire contact switch 17 and position switch 15 are connected to negative side of the power supply, which is ground 22. However, whether or not AA batteries and AAA batteries are properly set in position can also be detected with a circuit opposite the figure where one end of the voltage divider resistors is connected to the negative side of the power supply, which is ground, and the wire contact switch and position switch are connected to the positive side of the power supply.

As shown in FIGS. 3 and 8, the second battery holders 11B are made up of support sections 23, which are AA battery 2A holders, and oblique battery holders 9D, which are AAA battery 2B holders. The support sections 23 have oblique surfaces in the form of truncated V's or curved surfaces that form trough-shapes to support AA battery 2A cross-sections perpendicular to the lengthwise direction of the loaded AA batteries 2A. These trough-shaped surfaces retain the bottom sides of positive terminal ends of inserted AA batteries 2A in a manner that avoids lateral shifting. Oblique battery holders 9D, which are AAA battery 2B holders, are pairs of truncated V projections provided below and inside insulating base regions 9A of the convertible output terminals 8 in the vertical position. These projections hold positive terminal ends of AAA batteries 2B from below, and retain AAA batteries 2B loaded in these positions in a manner that avoids lateral shifting. Although battery holders 11 in the battery pocket 3 of the figures have one end formed to allow battery 2 end insertion, both ends may also be formed as openings to allow insertion and retention of battery end regions. Further, both ends of the battery holders may also be shaped to avoid lateral shifting.

When AAA batteries 2B are loaded, batteries 2 are held in the positions shown in FIGS. 9 and 10. Negative output terminals 7 are configured as a metal contact pieces. As shown in FIGS. 12–15, an output terminal 7 is bent in an arrowhead shape that projects towards the negative terminal of an AA battery 2A or AAA battery 2B. Output terminals 7 of the figures are provided with two rows of independent elastically deformable contact pieces 7A (refer to FIG. 13).

Cooling gaps 24 are provided in the battery pocket 3 of the figures between the first battery holders 11A and the second battery holders 11B. The cooling gaps 24 pass ventilation air from a cooling fan 25 housed in the case 1 for forced cooling of the batteries 2. A battery charger, which houses a cooling fan 25 in its case 1 and provides forced ventilation of batteries 2 from cooling gaps 24, has the characteristic that batteries can be charged to full charge in a short time while keeping battery temperatures low. The case 1 of the figures has a lower case 1B bottom plate that is curved with a recessed center region, and has a ventilation hole 26 opened in that center region to allow the cooling fan 25 to efficiently intake outside air. The cooling fan 25 housed in the case 1 intakes outside air through the ventilation hole 26 in the lower case 1B bottom plate, and provides forced ventilation to cool the batteries 2 via air from the cooling gaps 24.

Further, the first battery holders 11A and the second battery holders 11B are disposed to form gaps 27 (refer to FIG. 4) between adjacent batteries 2 in the battery pocket 3 of the battery charger of the figures. In this battery charger, forced ventilation air from cooling gaps 37, which flows towards the batteries 2, passes through the gaps 27 between batteries 2. Therefore, this configuration has the characteristic that batteries 2 loaded in the battery pocket 3 are efficiently cooled, and charging can be performed while reducing battery temperature increase. In FIG. 4, the AA battery 2A positioned at the left-most battery holder 11 is shown with solid lines, and M batteries 2A located in other battery holders 11 are shown with broken lines.

The battery charger is provided with four temperature detection sections 12, which press against the circular cylindrical surface of each battery 2 loaded in the battery pocket 3. Temperature detection sections 12 independently detect the temperature of each battery 2 loaded in the battery pocket 3. Since the battery charger of the figures charges four batteries 2, four temperature detection sections 12 are provided to detect the temperature of each battery 2.

Each temperature detection section 12 shown in FIGS. 12, 13, and 18–22 is provided with a thermal conducting plate 28 and a temperature detection device, which is a temperature sensor 4, mounted in the thermal conducting plate 28 to detect battery temperature. A thermal conducting plate 28 is provided with a pair of sandwiching plates 28A, 28B to enclose the temperature sensor 4 from above and below, a flexible connecting arm 28C to join the upper and lower sandwiching plates 28A, 28B at their first edge, and locking pieces 28D to join upper and lower sandwiching plates 28A, 28B at the second edge, which is positioned at the opposite end of the first edge, to enclose the temperature sensor 4. In this thermal conducting plate 28, upper and lower sandwiching plates 28A, 28B are joined at one end, which is the first edge, via the flexible connecting arm 28C. Next, the second edge is joined via the locking pieces 28D to enclose the temperature sensor 4 inside the two sandwiching plates 28A, 28B.

A temperature sensor 4 has a temperature detection section 4A attached to a flexible substrate 39. Film-type temperature sensors 4 are generally sold as off-the-shelf items, and as shown in the cross-sections of FIGS. 18–21, they have an approximately rectangular flat-plate temperature detection section 4A which projects with some thickness above the upper surface of the flexible substrate 39. The flexible substrate 39 has a width that can fit between projections 28E provided on both sides of the lower sandwiching plate 28B. As shown in the figures, this temperature sensor 4 is enclosed within the upper and lower sandwiching plates 28A, 28B to mount it in the thermal conducting plate 28 with its temperature detection section 4A in close contact or close proximity to the inside surfaces of the sandwiching plates 28A, 28B. The flexible substrate 39 of the temperature sensor 4 extends outside the thermal conducting plate 28 and is connected to the circuit board 5 (refer to FIG. 20). Thermistors are used as temperature sensors 4, but temperature sensors other than thermistors can also be used.

Thermal conducting plates 28 with temperature sensors 4 mounted inside upper and lower sandwiching plates 28A, 28B are shown in FIGS. 18–22. Upper and lower sandwiching plates 28A, 28B enclose and mount a temperature sensor 4 as follows.

Figure 22:
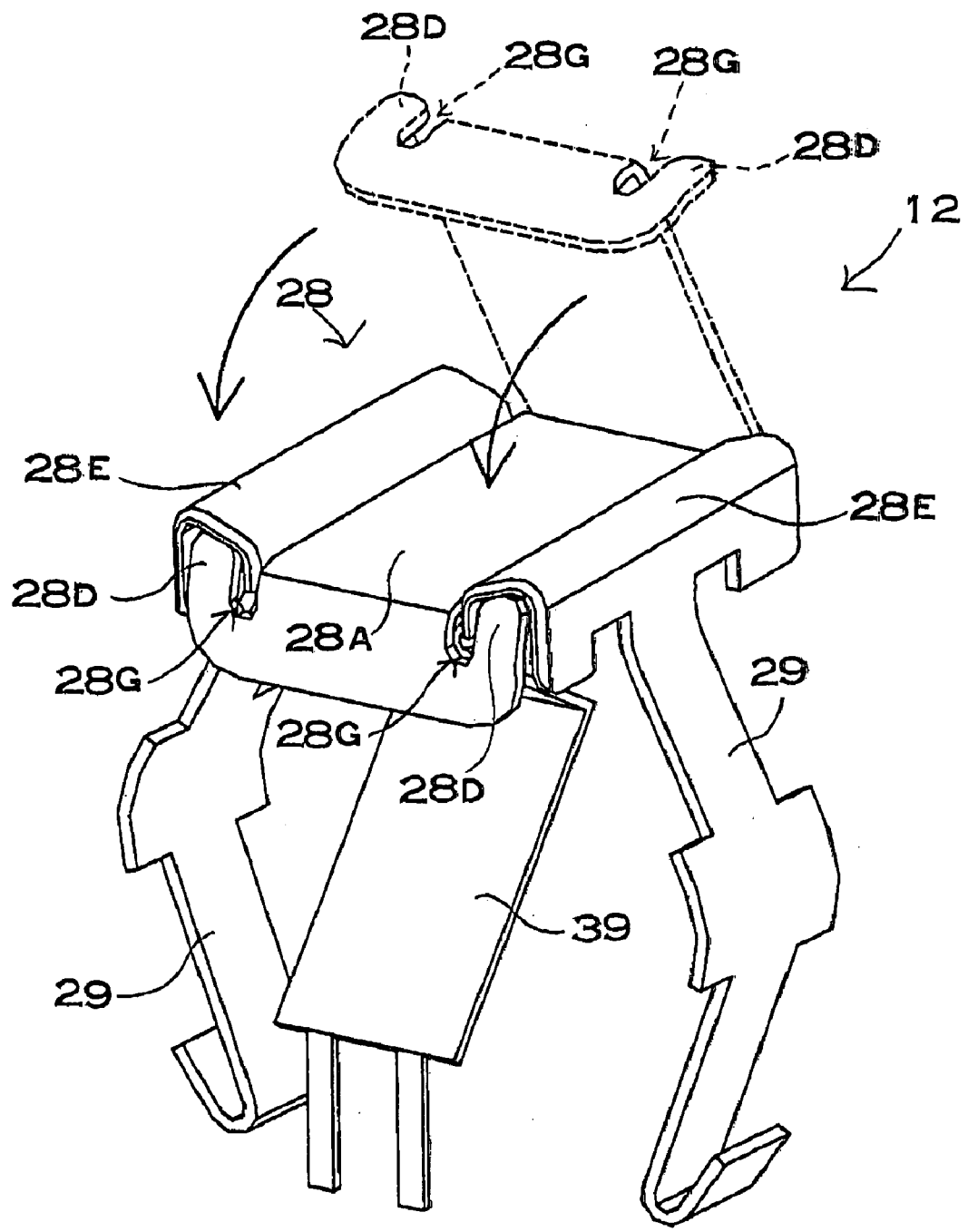
FIG. 22 is an enlarged oblique view of a temperature detection section.

(1) At the assembly stage shown by broken lines in FIG. 22, that is with the upper and lower sandwiching plates 28A, 28B open and the locking pieces 28D unconnected, a temperature sensor 4 is disposed on top of the lower sandwiching plate 28B.

(2) The upper sandwiching plate 28A is rotated in the direction shown by the arrow to enclose the temperature sensor 4 inside the upper and lower sandwiching plates 28A, 28B. When the upper sandwiching plate 28A is rotated in this direction, the flexible connecting arm 28C deforms elastically. The upper sandwiching plate 28A is rotated in the direction of the arrow, the upper sandwiching plate 28A is moved into proximity with the lower sandwiching plate 28B, and the temperature sensor 4 is sandwiched by the upper and lower sandwiching plates 28A, 28B.

(3) When the upper and lower sandwiching plates 28A, 28B are close and holding the temperature sensor 4 in a fixed position, the locking pieces 28D mate with the inside surfaces of the projections 28E to join the upper and lower sandwiching plates 28A, 28B in a manner that will not open. This completes the assembly.

In a temperature detection section 12, the part of the thermal conducting plate 28 that presses against a battery 2 is shaped to follow the circular cylindrical contour of the battery 2. The thermal conducting plates 28 shown in the figures have trough-shapes to effectively conduct battery 2 heat to the thermal conducting plates 28. Although thermal conducting plate 28 contact with the battery surface is desirable from a heat conduction perspective, a slight gap is acceptable. In the temperature detection sections 12 of the figures, thermal conducting plates 28 are flexibly pressed against the battery surfaces. Flexible legs 29 are formed from elastically deformable sheet metal as a single piece with the thermal conducting plate 28.

In the battery charger of the figures, temperature detection sections 12 are disposed away from the center of a battery 2 close to the first battery holders 11A. Since temperature detection sections 12 are disposed close to first battery holder 11A openings in which battery 2 end regions are inserted, upward shift in position of the batteries 2 can be effectively prevented even when being pushed upward by the thermal conducting plates 28. This is because a circular opening battery holder can prevent a battery 2 from shifting up and down and left and right. Therefore, in this configuration of battery charger, temperature detection section 12 thermal conducting plates 28 can press solidly against battery 2 surfaces, and battery temperature can be detected more accurately.

The four thermal conducting plates 28 have approximately the same shape. A thermal conducting plate 28 is made from elastically deformable sheet metal. A thermal conducting plate 28 holds a temperature sensor 4 between upper and lower sandwiching plates 28A, 28B. Sandwiching plates 28A, 28B, which hold a temperature sensor 4, are flexibly pressed against the battery surface to detect battery temperature by flexible legs 29. The thermal conducting plate 28 of the figures has projections 28E provided on both sides of the lower sandwiching plate 28B. The projections 28E are positioned on both sides of the upper sandwiching plate 28A, and specifically are positioned outside the upper sandwiching plate 28A. These types of projections 28E are formed by bending sheet metal. The upper sandwiching plate 28A is stacked on the lower sandwiching plate 28B between the projections 28E. The projections 28E extend upward higher than the upper sandwiching plate 28A, and the upper sandwiching plate 28A and the lower sandwiching plate 28B projections 28E form a trough-shape. As shown in the cross-sections of FIGS. 18–21, upper surfaces of the projections 28E and upper sandwiching plate 28A are put in contact or close proximity with a battery surface to detect battery temperature.

This type of thermal conducting plate 28 is formed by punching out and bending a single piece of sheet metal. A thermal conducting plate 28 made of a single piece of sheet metal is formed by processing upper and lower sandwiching plates 28A, 28B, flexible connecting arm 28C, locking pieces 28D, and flexible legs 29 as a connected shape. In the thermal conducting plate 28 of the figures, sheet metal forms the upper and lower sandwiching plates 28A, 28B connected with the flexible connecting arm 28C. In addition, the lower sandwiching plate 28B, projections 28E on both sides, and flexible legs 29 are also connected for punch-out processing of the unit.

Figure 20:
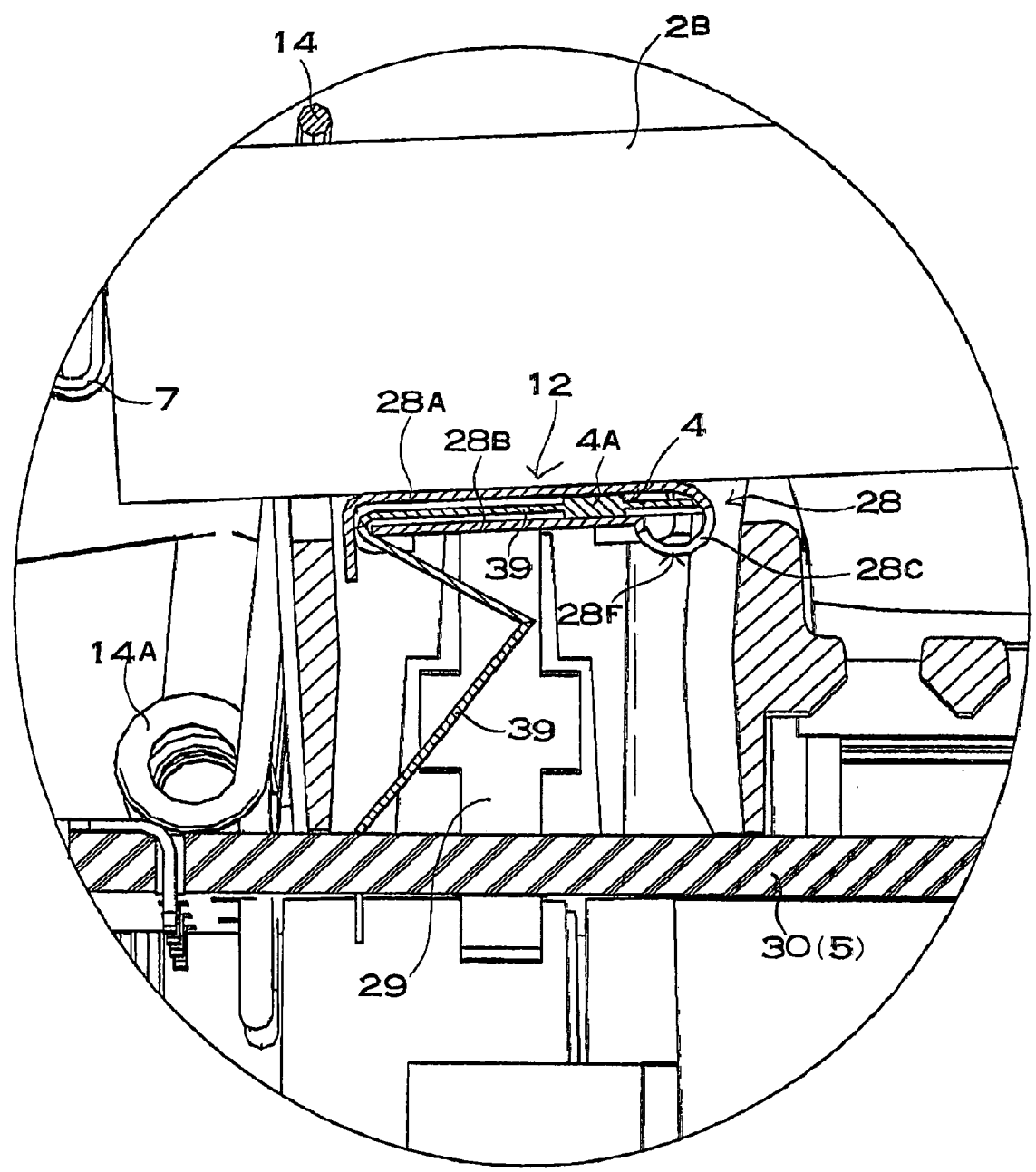
FIG. 20 is a lengthwise cross-section view of the temperature detection section shown in FIG. 19.

As shown in FIG. 13, the flexible connecting arm 28C is made up of two narrow rows of flexible connecting arms 28C, 28C, which form a shape that is flexible and easy to deform. In addition, as shown in FIGS. 13 and 20, the flexible connecting arm 28C has a curved shape with a specified radius of curvature to make it still more easily deformed. As shown in FIG. 13, the two narrow rows of flexible connecting arms 28C, 28C of the thermal conducting plate 28 have a slit 28F provided between them. In the thermal conducting plate 28 of the figures, the sandwiching plate 28A has its first edge as the edge closest lengthwise to the battery center, and the flexible connecting arm 28C is provided at that first edge. However, the first edge can also be the opposite edge. Further, in the thermal conducting plate 28 of the figures, the first and second edges of the sandwiching plate are the edges along the lengthwise direction of the battery 2. However, the edges of the sandwiching plate in the lateral direction of the battery can also be taken as the first and second edges.

In the thermal conducting plate 28 of the figures, the upper sandwiching plate 28A is provided with locking pieces 28D on both sides. The upper sandwiching plate 28A has its end region bent in an L-shape, cut-outs 28G are provided on both sides of the bent region, and locking pieces 28D are established outside those cut-outs 28G. Ends of the locking pieces 28D are bent to incline them in a direction towards the flexible connecting arm 28C. Specifically, in the assembled state, the ends of the locking pieces 28D are inclined away from vertical in a direction towards the flexible connecting arm 28C. These locking pieces 28D mate with the inside surfaces of the projections 28E established on both sides of the lower sandwiching plate 28B. Consequently, locking pieces 28D have shapes that fit into the inside surfaces of lower sandwiching plate 28B projections 28E. Said differently, the outlines of the locking pieces 28D are made smaller than the inside shapes of the projections 28E. As shown in FIG. 22, when upper and lower sandwiching plates 28A, 28B approach each other, locking pieces 28D, which are bent to an inclined posture, lock into the inside surfaces of the projections 28E. When the upper sandwiching plate 28A is rotated in the direction shown by the arrow and is moved into proximity with the lower sandwiching plate 28B, the locking pieces 28D flexibly deform to pass over the ends of the projections 28E and lock into the inside surfaces of those projections 28E. The ends of the projections 28E extend to positions that can mate with the ends of the locking pieces 28D.

As described above, a configuration, which provides locking pieces 28D on both sides of the upper sandwiching plate 28A, can reliably and stably join the upper and lower sandwiching plates 28A, 28B. However, the battery charger of the present invention does not specify or limit the fastening configuration of the upper and lower sandwiching plates 28A, 28B and locking pieces 28D to the mechanism described above. Although not illustrated, the upper and lower sandwiching plates can be joined in a manner that will not open with a single locking structure at the center of the bent region of the upper sandwiching plate, or a locking structure can also be provided on the lower sandwiching plate to join the plates in a manner that will not open. In addition, a through hole can also be established in one of the sandwiching plates, a locking structure can be inserted into that through hole, and upper and lower sandwiching plates can be joined in a configuration that will not open.

A thermal conducting plate 28 is cut from a single piece of elastically deformable sheet metal, and the sandwiching plate 28B is provided with connecting flexible legs 29. Flexible legs 29 are established on both sides of the sandwiching plate 28B. In this thermal conducting plate 28, the sandwiching plate 28B can press against the surface of a battery in a laterally balanced fashion. This is because flexible legs 29 on both left and right sides press the sandwiching plate 28B against the battery surface. Thermal conducting plates 28 with flexible legs 29 are shown in FIGS. 12, 13, 18, 19, and 22. Thermal conducting plates 28 shown in these and other figures are provided with flexible legs 29 connected to both sides of the lower sandwiching plate 28B. A pair of flexible legs 29 provided on the sides of a sandwiching plate 28B connects to an attachment plate 30 at the other end. The attachment plate is the circuit board 5. However, the attachment plate does not necessarily have to be the circuit board. For example, although not illustrated, the attachment plate may also be a base plate formed from a material such as plastic.

Figure 18:
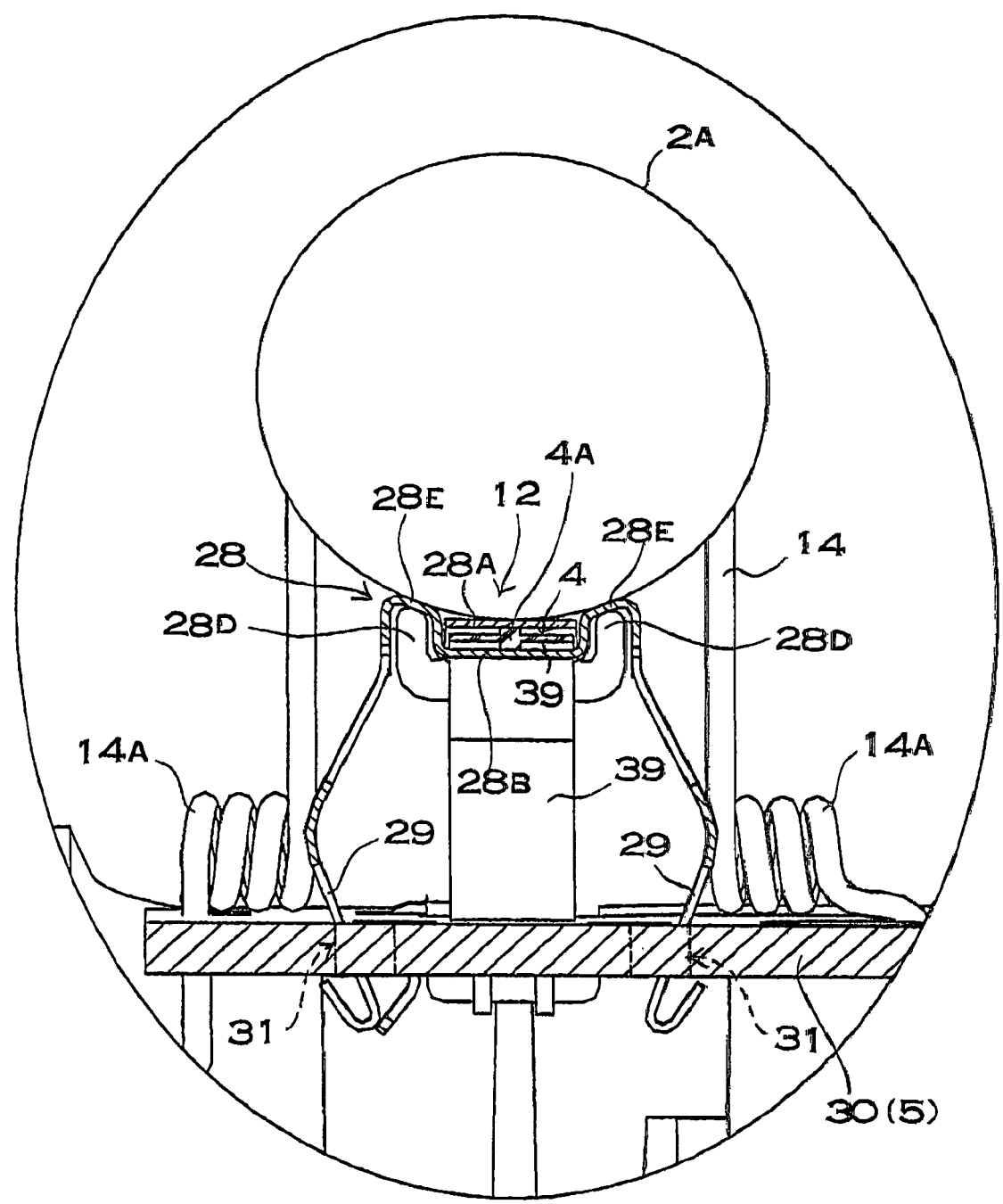
FIG. 18 is a cross-section view showing AA battery temperature detection via a temperature detection section.
Figure 19:
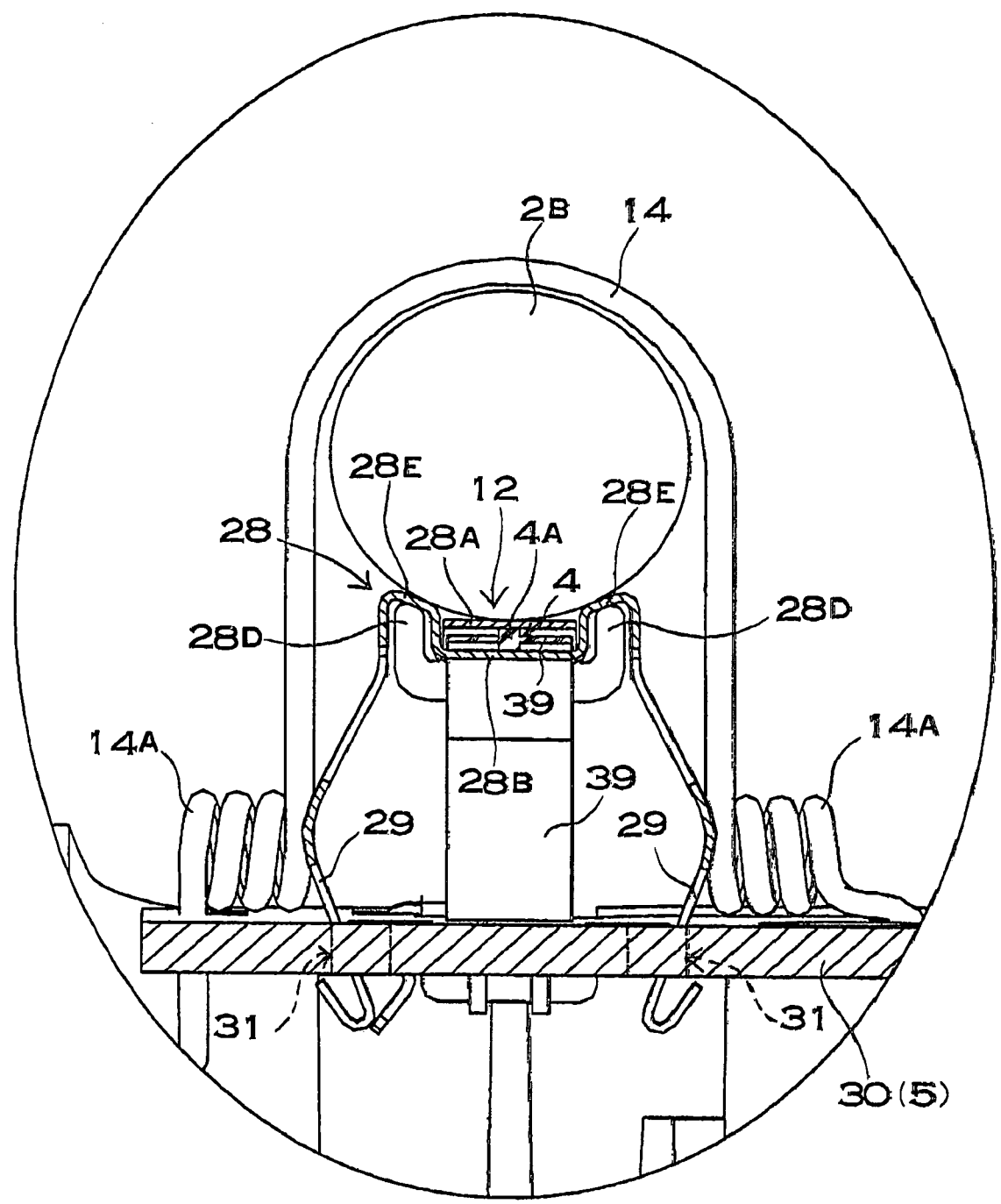
FIG. 19 is a cross-section view showing AAA battery temperature detection via a temperature detection section.

An attachment plate 30 has through holes 31 opened to connect the lower ends of a pair of flexible legs 29. The flexible legs 29 are inserted into the through holes 31 and joined to the attachment plate 30. As shown in FIGS. 13, 18, and 19, the flexible legs 29 are inserted into through holes 31 in a manner allowing them to move up and down with respect to the attachment plate 30. The bottom ends of the flexible legs 29 are bent outward to keep the flexible legs 29 from pulling out of the attachment plate 30 through holes 31. However, bottom ends of the flexible legs 29 can also be bent inward to join the flexible legs 29 to the attachment plate 30 in a manner that won't separate.

In this thermal conducting plate 28, flexible legs 29 move up and down in the attachment plate 30 through holes 31, and the sandwiching plates 28A, 28B press flexibly against a battery surface. To realize this, the flexible legs 29 shown in the figures are inclined to gradually separate the pair of legs as they extend upward from the through holes 31. The flexible legs 29 of FIGS. 18 and 19 are bent to give the left leg in the figures a < shape and the right leg a > shape and widen the gap between legs at the midpoint. The flexible legs can also be inclined opposite the figures to make the pair of legs closer as they extend upward from the through holes by giving the right leg a < shape and the left leg a > shape.

The flexible legs 29 of the figures flexibly apply force at their lower ends in a direction to widen the gap between legs and flexibly push upward on the sandwiching plate 28B. Flexible legs 29, which have flexible force to widen the gap, apply pressure in a direction to move the legs away from the attachment plate 30, and flexibly push the sandwiching plate 28B upward. When the sandwiching plate 28B is pressed against a battery surface, flexible legs 29 with a tendency to flexibly spread apart are forced narrower and pushed into the through holes 31. Since the pair of flexible legs 29 has pressure to flexibly spread apart, flexible legs 29 pushed into the attachment plate 30 through holes 31 will try to flexibly widen and push away from the attachment plate 30.

Since flexible legs 29 with the structure described above move up and down in the attachment plate 30 through holes 31 to press the sandwiching plate 28B against a battery surface, the sandwiching plate 28B can flexibly press against a battery surface with a larger up and down range. Therefore, this configuration has the characteristic that sandwiching plates 28A, 28B can reliably and stably press against a battery surface, and battery temperature can be reliably detected.

In addition, since the flexible legs 29 can be mounted on the attachment plate 30 by inserting their lower ends into through holes 31, this configuration has the characteristic that it can be simply and easily mounted on the attachment plate 30. Further, since the lower ends of the flexible legs 29 can be detached from the attachment plate 30 through holes 31, this configuration has the characteristic that a thermal conducting plate 28 can be replaced easily.

Figure 21:
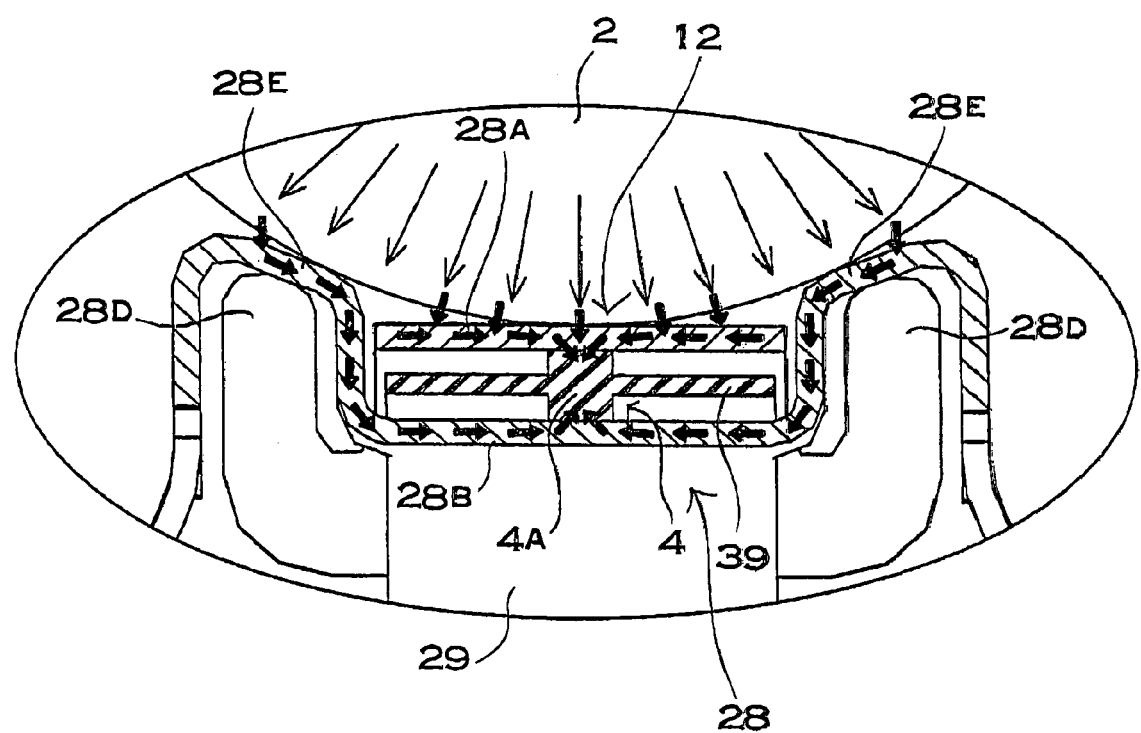
FIG. 21 is an enlarged cross-section view showing battery temperature detection by a temperature sensor.

As shown by the arrows of FIG. 21, battery 2 heat is conducted to the temperature sensor 4 via the sandwiching plates 28A, 28B of the previously described temperature detection section 12. In particular, battery 2 heat is effectively conducted by the sandwiching plates 28A, 28B flexibly pressed in contact with the battery surface. A temperature sensor 4 is enclosed between sandwiching plates 28A, 28B, and sandwiching plate 28A, 28B heat is effectively conducted to the temperature sensor 4. The thermal conducting plate 28 of the figures has projections 28E established on both sides of the lower sandwiching plate 28B and the surfaces of those projections 28E are put in contact with the battery surface. A lower sandwiching plate 28B, which has its projections 28E in contact with the battery surface, efficiently conducts battery 2 heat, and conducts that heat to the temperature sensor 4. In addition, the center region of the upper sandwiching plate 28A can also be put in contact with the battery 2 surface. This upper sandwiching plate 28A efficiently conducts battery 2 heat, and efficiently conducts that heat to the temperature sensor 4 sandwiched under its bottom surface.

In a battery charger, which efficiently conducts AA battery 2A and AAA battery 2B heat via the route described above, battery 2 heat is efficiently conducted from the sandwiching plates 28A, 28B to the temperature sensor 4. Further, the temperature sensor 4 does not contact air, and is not cooled by air. Still further, air does not enter the region between the battery 2 and the thermal conducting plate 28 sandwiching plates 28A, 28B. Therefore, the sandwiching plates 28A, 28B are not cooled by air, and battery 2 heat is effectively conducted from the sandwiching plates 28A, 28B to the temperature sensor 4. Consequently, battery 2 heat is effectively conducted from the sandwiching plates 28A, 28B to the temperature sensor 4, sandwiching plate 28A, 28B and temperature sensor air cooling is reduced, and AA battery 2A and AAA battery 2B temperature can be accurately detected by the temperature sensor 4 with high precision while reducing time delay.

When AAA batteries 2B, which are narrower than AA batteries 2A, are loaded, the center region of the upper sandwiching plate 28A contacts the battery surface. Although the projections 28E on the lower sandwiching plate 28B contact the surface of an AA battery 2A, the center region of the upper sandwiching plate 28A contacts the surface of an AAA battery 2B, which has a smaller outside diameter.

The battery charger of the present embodiment has a socket 33 connected to an external power cord 32 (refer to FIG. 11), and four light emitting diodes (LEDs) 34 which light during charging to indicate the charging state of each battery.

The charging circuit detects battery temperature via the temperature sensors 4, controls average charging current to keep battery temperature at a holding temperature, and charges batteries while maintaining battery temperature at the holding temperature. This battery charger has the characteristic that batteries 2 can be charged in an extremely short time. In particular, by charging while maintaining the temperature of both AA batteries 2A and AAA batteries 2B at the holding temperature, both AA batteries 2A and AAA batteries 2B can be charged in a short period.

Figure 23:
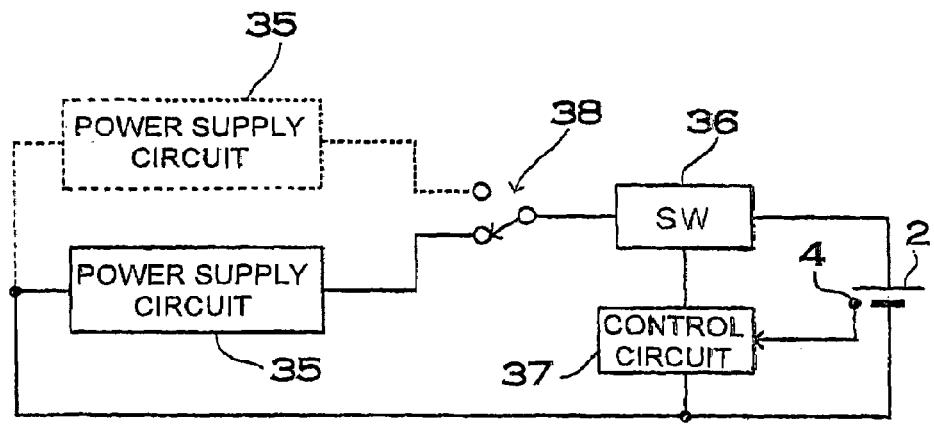
FIG. 23 is a circuit diagram showing one example of a charging circuit in a battery charger of an embodiment of the present invention.

FIG. 23 shows the charging circuit. This charging circuit is provided with a power supply circuit 35 to supply charging current to charge the battery 2, a switching device 36 connected between the power supply circuit 35 and the battery 2 to regulate average charging current to the battery 2, a control circuit 37 to control charging current by switching the switching device 36 on and off, and a temperature sensor 4 to detect battery temperature and input a temperature signal to the control circuit 37. Here, although FIG. 23 shows one battery 2, and the discussion refers to a battery 2 in the singular, it should be clear that a plurality of batteries 2 can also be charged according to the same battery charger and charging circuit.

Figure 24:
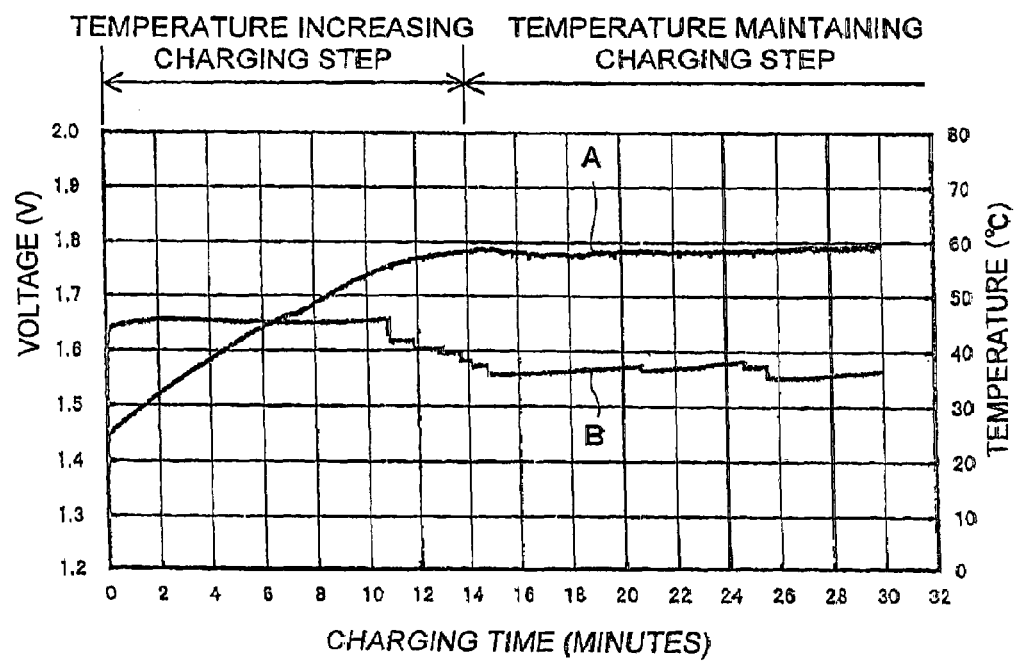
FIG. 24 is graph showing temperature characteristics and voltage characteristics during battery charging for a battery charger of an embodiment of the present invention.

The graph of FIG. 24 shows battery temperature rise and battery voltage variation characteristics when a battery 2 is charged with the charging circuit of FIG. 23. In FIG. 24, curve A is the battery temperature rise characteristic curve, and curve B is the battery voltage variation characteristic curve. As shown in FIG. 24, the charging circuit of FIG. 23 does not reduce the rate of battery temperature rise at full charge, but rather raises battery temperature to a specified temperature at the commencement of charging in a temperature increasing charging step, and subsequently charges while maintaining battery temperature at a holding temperature in a temperature maintaining charging step. Consequently, high current is forced at the beginning of charging and battery temperature is raised. In other words, the battery 2 is charged with a current large enough to raise the battery temperature. Although the battery 2 is charged by high current at this time, no battery performance degradation occurs because battery temperature does not immediately become high. Therefore, the battery 2 can be charged at high capacity during this time interval.

With the switching device 36 in the ON state, the power supply circuit 35 is capable of high current output to charge a battery 2 with an average of 1.5 C to 10 C, preferably 2 C to 8 C, and still more preferably 2 C to 5 C. The power supply circuit can be configured as a separate unit and connected to the control circuit via extension leads. However, the power supply circuit and control circuit can also be housed in the same case. Since AA battery 2A and AAA battery 2B charge capacity is different, they are each charged with their optimum current.

As shown in FIG. 23, the charging circuit can also switch between a plurality of power supply circuits 35 to charge a battery 2. The plurality of power supply circuits 35 are connected to the switching device 36 via a switch 38. The switch 38 switches to select the power supply circuit 35 for battery 2 charging. The plurality of power supply circuits 35 have different peak currents during pulse charging. Even if average battery charging currents are the same, battery 2 heat generation will increase with high peak current during pulse charging. Therefore, if the power supply circuit 35 is switched to a lower peak current supply when the battery 2 is charged with high current, battery 2 heat generation can be reduced. Consequently, battery temperature rise can be reduced while charging with a higher average current.

The switching device 36 is a bipolar transistor or FET which is switched by the control circuit 37 to pulse charge a battery 2. The switching device 36 is held in the ON state without switching to initially charge the battery 2 with high current until battery temperature rises to a specified temperature and holding temperature. In this case, charging is constant current charging. The switching device 36 can also be switched ON and OFF at a prescribed duty cycle to initially charge the battery 2 with pulsed high current (high average current) until battery temperature rises to the specified temperature and holding temperature.

Average charging current for pulse charging a battery 2 is regulated by the duty cycle for switching the switching device 36 ON and OFF. The duty cycle (Q) for pulse charging is a ratio of the time the switching device 36 is ON (ton) and the time the switching device 36 is OFF (toff), and is given by the following formula.

$$Q = ton/(ton+toff)$$

Consequently, as the duty cycle for switching the switching device 36 ON and OFF is decreased, average charging current decreases, and conversely as the duty cycle is increased, average charging current increases The control circuit 37 detects battery temperature from a signal input from the temperature sensor 4, and switches the switching device 36 ON and OFF at a prescribed duty cycle. The duty cycle for switching the switching device 36 ON and OFF is small for high battery temperature, and is increased as battery temperature drops to maintain battery temperature at the holding temperature. As shown in FIG. 24, since battery temperature is initially low at the beginning of charging, the battery 2 is charged with high current until battery temperature reaches a specified temperature. Subsequently, the control circuit 37 controls the duty cycle of the switching device 36 to maintain battery temperature at the holding temperature. The control circuit 37 switches the switching device 36 ON and OFF with a period of 1 msec to 10 sec, preferably 10 msec to 2 sec, and still more preferably 50 msec to 2 sec.

When temperature detected by the temperature sensor 4 is lower than the holding temperature, the control circuit 37 increases the duty cycle to increase the average pulse charging current and raise battery 2 temperature. When battery temperature rises to the holding temperature, the control circuit 37 controls the switching device 36 by reducing the duty cycle to prevent battery temperature from exceeding the holding temperature. Further, the control circuit 37 controls the switching device 36 duty cycle to prevent battery temperature from dropping below the holding temperature. Consequently, the control circuit 37 charges the battery 2 neither by constant current charging nor by constant voltage charging. The control circuit 37 controls the switching device 36 duty cycle to regulate average charging current and control battery 2 temperature to behave as shown by curve A of FIG. 24.

The charging circuit of FIG. 23 charges a battery 2 by the following steps. Although the following is an example of a nickel hydrogen battery charging method, a nickel cadmium battery can also be charged in the same manner by changing the charging current. However, before beginning charging, the previously described detection circuit 16 judges whether or not AA batteries 2A or AAA batteries 2B are loaded in proper position. After confirming that M batteries 2A or AAA batteries 2B are set in proper position, charging is performed by the following steps. Further, since AA battery 2A and AAA battery 2B charge capacity is different, they are each charged with their optimum current.

(1) First, prior to beginning charging, the temperature sensor 4 in the charging circuit detects the temperature of the battery to be charged. When the detected battery temperature is within the specified range for commencing charging, the temperature increasing charging step is initiated. The specified temperature range for commencing charging with the temperature increasing charging step is 0° C. to 40° C., and preferably 10° C. to 30° C. When battery temperature is below or above the specified range for commencing charging, ordinary charging is initiated while detecting battery voltage. Ordinary charging controls charging current for charging at or below 1 C. while monitoring battery voltage, and full charge is determined when battery voltage reaches a peak or drops a $\Delta V$ from that peak.

Further, remaining capacity of the battery 2 is determined from battery voltage. This is done because if a battery near full charge is charged according to the temperature increasing charging step, over-charging will occur and battery performance will degrade. A battery with voltage below a prescribed battery voltage is judged to have low remaining capacity, and charging is started according to the temperature increasing charging step. A battery with voltage higher than the prescribed battery voltage is judged to have high remaining capacity with the likelihood of over-charging if charged by the temperature increasing charging step. Therefore, ordinary charging is started for a battery with voltage higher than the prescribed battery voltage.

In addition, internal resistance of the battery 2 is detected at the start of charging. When internal resistance is higher than a prescribed resistance, no transition to the temperature increasing charging step is made and ordinary charging is performed. If internal resistance becomes smaller than the prescribed resistance after ordinary charging, the temperature increasing charging step may be started as well.

(2) In the case of battery 2 temperature within the specified range for commencing charging and battery voltage lower than the holding temperature, the temperature increasing charging step is started. In the temperature increasing charging step, the battery 2 is charged with a high current which raises battery temperature at a prescribed rate. In this step, the battery 2 is charged with an average current that makes battery temperature rise at a rate of about 3° C./minute. In the case of an AA type nickel hydrogen battery with a nominal capacity of 2100 mAh, the rate of temperature rise becomes 3° C./minute with an average charging current for 2 C to 3 C. However, in this step, the battery 2 can be charged with an average charging current that makes the rate of temperature rise 1° C./minute to 5° C./minute. Further, the average charging current may charge at 1.5 C to 10 C as well.

In addition, when charging with a prescribed average current (for example, 2.5 C), if a rate of temperature rise (normally the rate of temperature rise is 2° C./minute to 3° C./minute) greater than a specified value (for example, 5° C./minute) is detected, or if a $-\Delta V$ (for example, 60 mV) is detected, the battery 2 is treated as fully charged and charging is terminated to prevent over-charging. As described above, prior to beginning charging, battery voltage is measured to detect remaining battery capacity, and a battery with high remaining capacity is charged by ordinary charging to prevent over-charging. However, when judging remaining capacity based on battery voltage, battery voltage may not always suitably reflect remaining capacity, and the action above prevents over-charging in that case. Namely, suppose a battery, which actually has large remaining battery capacity, has low battery voltage. That battery would be judged to have low remaining battery capacity and would be charged with a high current by the temperature increasing charging step, but when a rate of temperature rise greater than a specified value or a $-\Delta V$ was detected, the battery would be judged as fully charged and over-charging would be prevented.

In this step, the switching device 36 is maintained in the ON state, or the duty cycle of the switching device 36 is large to make the average charging current within the previously mentioned range. When battery temperature rises to the specified temperature and approaches the holding temperature, average charging current is decreased to reduce the rate of battery 2 temperature rise. For example, if the holding temperature is approximately 57° C. to 60° C., and the specified temperature (for example, approximately 55° C.) is detected, average charging current is decreased to reduce the rate of battery 2 temperature rise.

In FIG. 24, when battery temperature rises to the specified temperature of approximately 55° C., that temperature is detected, and average charging current is reduced to mellow the rate of temperature rise and approach the holding temperature (curve A, temperature increasing charging step at about 11 minutes of charging time in FIG. 24). Average charging current is controlled by reducing the ON-OFF duty cycle of the switching device 36. In this type of charging method which reduces average charging current when battery 2 temperature approaches the holding temperature and reaches the specified temperature, overshoot of the holding temperature is prevented, and battery 2 degradation due to the negative effects of high temperature can be effectively prevented. However, the battery 2 may also be charged with an average charging current which maintains the specified rate of temperature rise until the holding temperature is reached.

Further, in the temperature increasing charging step, if temperature does not rise to a specified temperature (for example, the temperature increasing charging step specified temperature of approximately 55° C., or the holding temperature discussed below) in a prescribed time (for example, 15 minutes), charging current can be set to a current approximately equal to the average charging current for the temperature maintaining charging step (about half the average charging current of the temperature increasing charging step or about 1.5 C), and charging can be controlled according to the temperature maintaining charging step. By this action, negative effects on a battery, with low temperature (approximately 0° C. to 10° C.) prior to beginning charging, as a result of sudden temperature rise can be reduced.

(3) When battery temperature rises to the holding temperature at the end of the temperature increasing charging step, average charging current is regulated to maintain battery temperature at the holding temperature for charging according to the temperature maintaining charging step. In this temperature maintaining charging step, the control circuit 37 controls the ON-OFF duty cycle of the switching device 36 to regulate the average current for pulse charging and maintain battery temperature at the holding temperature. In this step, the temperature sensor 4 detects battery temperature and inputs a temperature signal to the control circuit 37. The control circuit 37 controls the ON-OFF duty cycle of the switching device 36 with the detected battery temperature. When battery temperature becomes high, the duty cycle is reduced, average charging current is decreased, and battery temperature is lowered. When battery temperature becomes low, the duty cycle is increased, average charging current is increased, and battery temperature is raised. In this fashion, charging is performed while maintaining battery temperature at the holding temperature. In the temperature maintaining charging step, it is desirable to hold battery temperature at a single temperature (for example, 58° C.).

Here, the holding temperature is set near a maximum temperature which is below the temperature that results in performance degradation and negative effects on the battery. In addition, the holding temperature is set to a temperature at which the user has no problem touching the battery 2 and does not feel that it is abnormally hot. For this level of holding temperature, the maximum is set about 70° C., preferably 65° C. or less and more preferably 63° C. or less. As a holding temperature range, 50° C. to 65° C. is preferable, 53° C. to 63° C. is more preferable, and 56° C. to 61° C. and 57° C. to 60° C. are even more preferable.

To maintain battery temperature at the holding temperature in the present embodiment, temperature is controlled as follows. First, a specified control temperature (for example, 58° C.) is set for the holding temperature. For example, for every 1° C. that the detected battery temperature is above the specified control temperature, average charging current is reduced in stages. Similarly, for every 1° C. that the detected battery temperature is below the specified control temperature, average charging current is increased in stages. By this type of control, charging is performed while maintaining battery temperature at the holding temperature.

In place of the specified control temperature described above, a specified control temperature range (for example, 57° C. to 59° C.) may be set. For example, for every 1° C. that the detected battery temperature is above the specified control temperature range, average charging current is reduced in stages. Similarly, for every 1° C. that the detected battery temperature is below the specified control temperature range, average charging current is increased in stages. Again, by this type of control, charging is performed while maintaining battery temperature at the holding temperature. In addition, during the temperature maintaining charging step, if temperature rise greater than a specified rate of temperature rise (for example, 2° C./minute), battery temperature greater than a specified temperature (for example, 62° C.), or a −ΔV (for example, 60 mV) is detected, the battery 2 can be treated as fully charged and charging can be terminated In this temperature maintaining charging step, when the battery 2 nears full charge, the tendency for battery temperature to rise becomes stronger even though average charging current is reduced. Consequently, as the battery 2 nears full charge, battery temperature rises or tries to rise, but average charging current decreases to maintain the holding temperature. Specifically, the control circuit 37 controls the ON-OFF duty cycle of the switching device 36 to an extremely small value. As a result, the control circuit 37 abruptly decreases the average charging current as the battery 2 nears full charge. Consequently, in the temperature maintaining charging step, even if full battery charge is not detected and charging is not suspended, average charging current is rapidly reduced and over-charging is prevented. In the temperature maintaining charging step of the present embodiment, charging is terminated by a timer. The timer is set to a time period (for example, approximately 30 minutes) that will sufficiently charge the battery 2 to approximately full charge. In the present embodiment, since battery temperature rises and average charging current decreases near full charge as described above, charging is terminated by detecting this decrease in current, even if it is prior to timer expiration.

Further, when charging the battery by the temperature maintaining charging step, internal resistance of the battery 2 is detected. When battery 2 internal resistance becomes greater than a specified value, ordinary charging is performed and charging current is reduced. Even in ordinary charging, battery 2 temperature is kept from becoming higher than the holding temperature.

(4) By the temperature increasing charging step and temperature maintaining charging step above, the battery 2 is essentially fully charged. However, the battery 2 does not completely reach full charge. Ordinary charging can be performed after the temperature maintaining charging step to fully charge the battery 2 to completion.

In the charging method described above, a battery 2 is pulse charged during a temperature increasing charging step and temperature maintaining charging step. However, it is not always a requirement to adjust average charging current by controlling the pulse charging duty cycle. For example, in the temperature increasing and temperature maintaining charging steps, charging current for continuous charging can also be controlled, and the battery can be charged by a specified current as the average charging current.

The charging circuit described above charges by controlling average charging current to maintain battery temperature at a specified temperature. However, the charging circuit may also charge the battery 2 with constant current, and terminate charging when peak battery voltage is detected or when a ΔV drop from that peak voltage is detected. This charging circuit suspends or interrupts charging when battery temperature rises above a set temperature, and keeps battery temperature from exceeding a set temperature.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on Application No. 2004-252,400 filed in Japan on Aug. 31, 2004, the content of which is incorporated hereinto by reference.

What is claimed is:

1. A battery charger comprising:
    a battery pocket in a case for mounting AA batteries and AAA batteries in manner allowing loading and unloading, temperature detection sections to contact and detect the temperature of AA batteries and AAA batteries loaded in the battery pocket, and a charging circuit to detect battery temperature via the temperature detection sections and control battery charging;
    AA battery holders are provided to retain AA batteries in fixed positions in the battery pocket, AAA battery holders are provided to retain AAA batteries in fixed positions in the battery pocket, AA battery holders are circular openings in the case, and AAA battery holders are flexible arches; wherein
    a circular opening is an opening in the case with a size that can accept and hold an AA battery in a fixed position,
    a flexible arch is an arch-shaped arm in which an AAA battery can be inserted but an AA battery cannot be inserted, and it is attached in a manner allowing it to flexibly incline when pressed against by an AA battery;
    an AAA battery is inserted into a flexible arch holder and retained in a fixed position in the battery pocket, an AA battery is not inserted into a flexible arch, but rather moves the flexible arch causing it to incline, and is inserted into a circular opening holder for retention in a fixed position in the battery pocket; and
    batteries set in fixed positions in the battery pocket are charged while detecting battery temperature via the temperature detection sections.

2. A battery charger as recited in claim 1 wherein the flexible arches detect whether or not AAA batteries are properly set in position.

3. A battery charger as recited in claim 2 wherein whether or not a flexible arch contacts an output terminal is detected to detect if an AAA battery is properly set in position.

4. A battery charger as recited in claim 1 wherein the flexible arches are conducting flexible metal wire.

5. A battery charger as recited in claim 4 wherein the flexible arches are conducting flexible metal wire curved into a U-shape and fixed at both ends.

6. A battery charger as recited in claim 4 wherein the flexible arches are provided with coiled-spring sections at their lower ends.

7. A battery charger as recited in claim 1 wherein a circuit board is housed inside the case, and output terminals, which connect with battery terminals, and flexible arches are attached to that circuit board.

8. A battery charger as recited in claim 1 wherein output terminals, which connect with battery terminals, are provided; and the flexible arches are in positions separated from the output terminals when not pressed against by batteries.

9. A battery charger as recited in claim 1 wherein output terminals, which connect with battery terminals, are provided; and a flexible arch deforms elastically to contact an output terminal when pressed against by an AA battery.

10. A battery charger as recited in claim 1 wherein output terminals, which connect with battery terminals, are provided; and a flexible arch contacts an output terminal when pressed against by an AAA battery, which is not properly seated in position.

11. A battery charger as recited in claim 1 wherein output terminals, which connect with battery terminals, are provided; and a flexible arch contacts an output terminal when an AA battery is properly set in position, and does not contact an output terminal when an AAA battery is properly set in position.

12. A battery charger as recited in claim 1 wherein a flexible arch is disposed in a position that contacts an output terminal, which connects with a battery terminal, when pressed to an inclined attitude by an AA battery, and the flexible arch and output terminal form a wire contact switch.

13. A battery charger as recited in claim 12 wherein the ON or OFF state of a wire contact switch, which is made up of a flexible arch and an output terminal, is detected to determine the set position of an AAA battery.

14. A battery charger as recited in claim 1 wherein convertible output terminals are provided to switch between loading AA batteries and AAA batteries in the battery pocket.

15. A battery charger as recited in claim 14 wherein a position switch that detects the position of the convertible output terminals is provided, and the ON or OFF state of the position switch is detected to determine the batteries set in the battery pocket.

16. A battery charger as recited in claim 15 wherein a flexible arch is disposed in a position that contacts an output terminal, which connects with a battery terminal, when pressed to an inclined attitude by an AA battery, and the flexible arch and output terminal form a wire contact switch; and the ON or OFF states of the wire contact switches and the position switch are detected to determine the set positions of AA batteries and AAA batteries loaded in the battery pocket.

17. A battery charger as recited in claim 16 wherein a detection circuit is provided to detect the ON or OFF states of the wire contact switches and the position switch.

18. A battery charger as recited in claim 17 wherein the detection circuit is provided with voltage divider resistors and a voltage detection circuit to detect voltage at an intermediate node of the voltage divider resistors; voltage divider resistors are connected in series with the wire contact switch and are connected to the power supply; further, the intermediate node of the voltage divider resistors connects to either the positive or negative side of the power supply via the position switch 15; and the voltage detection circuit detects intermediate node voltage to detect the ON or OFF states of the wire contact switches and the position switch and judge the set positions of AA batteries and AAA batteries.

19. A battery charger as recited in claim 18 wherein the detection circuit judges an AA battery is properly set when the position switch and a wire contact switch are ON.

20. A battery charger as recited in claim 18 wherein the detection circuit judges an AAA battery is properly set when the position switch and a wire contact switch are OFF.

21. A battery charger as recited in claim 18 wherein the detection circuit judges an AAA battery is improperly set when the position switch is OFF and a wire contact switch is ON.

* * * * *